United States Patent
Sugishita et al.

(10) Patent No.: US 6,530,208 B1
(45) Date of Patent: Mar. 11, 2003

(54) STEAM COOLED GAS TURBINE SYSTEM WITH REGENERATIVE HEAT EXCHANGE

(75) Inventors: Hideaki Sugishita, Takasago (JP); Sunao Aoki, Takasago (JP); Kazuo Uematsu, Takasago (JP); Keizo Tsukagoshi, Tokyo (JP)

(73) Assignee: Mitsubishi Heavy Industries, Co., Ltd., Tokyo (JP)

( * ) Notice: Subject to any disclaimer, the term of this patent is extended or adjusted under 35 U.S.C. 154(b) by 0 days.

(21) Appl. No.: 09/865,616

(22) Filed: May 29, 2001

(30) Foreign Application Priority Data

Aug. 8, 2000 (JP) ........................................ 2000-239479

(51) Int. Cl.$^7$ ................................................. F02C 6/00
(52) U.S. Cl. .................... 60/39.182; 60/39.12; 60/39.3; 60/806
(58) Field of Search .......................... 60/39.12, 39.182, 60/39.181, 39.3, 39.511, 730, 806

(56) References Cited

U.S. PATENT DOCUMENTS

| | | | |
|---|---|---|---|
| 5,579,631 A | * 12/1996 | Chen et al. ................. | 60/39.05 |
| 5,979,156 A | * 11/1999 | Uematsu et al. .......... | 60/39.182 |
| 6,089,012 A | * 7/2000 | Sugishita et al. ......... | 60/39.182 |
| 6,116,017 A | * 9/2000 | Mori et al. ................. | 60/39.182 |
| 6,212,873 B1 | * 4/2001 | Sugishita et al. ......... | 60/39.182 |
| 6,216,439 B1 | * 4/2001 | Nakamoto ................. | 60/39.094 |
| 6,244,039 B1 | * 6/2001 | Sugishita et al. ......... | 60/39.182 |
| 6,247,302 B1 | * 6/2001 | Tsukamoto et al. ....... | 60/39.511 |
| 6,354,073 B1 | * 3/2002 | Hiramoto et al. ......... | 60/39.182 |

FOREIGN PATENT DOCUMENTS

JP 10-331608 12/1998

* cited by examiner

Primary Examiner—Charles G. Freay
Assistant Examiner—John F Belena
(74) Attorney, Agent, or Firm—Wenderoth, Lind & Ponack, L.L.P.

(57) ABSTRACT

A combined cycle system includes a gas turbine (8) having a generator (1), a compressor (2), a combustor (3), a blade cooling air cooler (4), a fan (5), and a turbine (6); a steam turbine (29) having a high pressure turbine (21), an intermediate pressure turbine (22), and a low pressure turbine (23); and a waste heat recovery boiler (9). Saturated water from a high pressure pump (27) is partially led into a heat exchanger (110) for cooling steam to be supplied into a moving blade (52) and a stationary blade (53). Also, outlet steam from the high pressure turbine (21) is led into the moving blade (52), the stationary blade (53), and the combustor transition piece (54) for cooling thereof, and the steam is then supplied to an inlet of the intermediate pressure turbine (22). Further, the outlet steam from the high pressure turbine (21) is led into the turbine (6) for cooling blades thereof. The steam used for cooling the stationary blade is supplied to the inlet of the intermediate pressure turbine (22), and the steam used for cooling the moving blade is supplied to a reheater (20). Thus, the efficiency is enhanced.

7 Claims, 26 Drawing Sheets

STEAM COOLED GAS TURBINE SYSTEM WITH REGENERATIVE HEAT EXCHANGE

BACKGROUND OF THE INVENTION

1. Field of the Invention

The present invention relates generally to a steam cooled gas turbine system and more particularly to a steam cooled gas turbine system in which temperature and flow rate of cooling steam are efficiently controlled and heating of fuel and cooling of gas turbine blade cooling air are carried out by steam generated at a waste heat recovery boiler.

2. Description of the Prior Art

FIG. 26 is a diagram of a steam cooled gas turbine system in the prior art. In FIG. 26, the prior art steam cooled gas turbine system is constructed of a gas turbine 8, a waste heat recovery boiler 9 and a steam turbine 29. In the gas turbine 8, suction air is taken into a compressor 2 and compressed to a predetermined pressure. The compressed air is partially used for cooling a gas turbine blade, but most of the compressed air is led into a combustor 3 to be mixed with fuel 7 for generation of a high temperature gas. The high temperature gas enters a turbine 6 and expands to accomplish work, and a turbine output after deduction of a compressor output is converted into an electric power at a generator 1. On the other hand, outlet steam from a high pressure turbine 21 flowing through piping 101 is partially supplied into the turbine 6 for cooling the gas turbine blade via a cooling steam supply piping 101a. This steam is heated by cooling a steam cooled blade 51, and is recovered into an inlet of an intermediate pressure turbine 22 via cooling steam recovery piping 102. Thus, for cooling the gas turbine blade, the air bled from the compressor 2 and a portion of the outlet steam of the high pressure turbine 21 are used.

While outlet air of the compressor 2 is partially used for blade cooling in the turbine 6, this air, being of a high temperature, is cooled to a predetermined temperature at a blade cooling air cooler 4 using a cooling fan 5 and is then used for the turbine blade cooling. Thus, the air led from the compressor 2 is cooled once at the blade cooling air cooler 4 using the cooling fan 5, and then supplied into the turbine 6.

In the waste heat recovery boiler 9, outlet steam from a low pressure turbine 23 is converted into water from steam at a condenser 25. Then, the water is pressurized at a feed water pump 26 and heated at a feed water heater 10 to become saturated water. This saturated water is separated into three systems of water. The first system becomes saturated steam at a low pressure evaporator 11 and becomes superheated steam at a low pressure superheater 15 and is then supplied to an inlet of the low pressure turbine 23. The second system is pressurized to a predetermined pressure at an intermediate pressure pump 28, becomes saturated water at an intermediate pressure economizer 12, becomes saturated steam at an intermediate pressure evaporator 14, becomes superheated steam at an intermediate pressure superheater 16, and is then supplied to an inlet of a reheater 20. The third system is pressurized to a predetermined pressure at a high pressure pump 27, becomes saturated water at a first high pressure economizer 13 and a second high pressure economizer 17, becomes saturated steam at a high pressure evaporator 18, becomes superheated steam at a high pressure superheater 19, and is then led into the high pressure turbine 21. The mentioned superheated steam enters the high pressure turbine 21, the intermediate pressure turbine 22 and the low pressure turbine 23, respectively, to expand for generating an output, and this output is converted into electric power at a generator 24.

With respect to the above-mentioned cooling by steam, it is impossible to use the steam in a quantity in excess of that of the steam obtainable at the outlet of the high pressure turbine 21. Hence, in order to secure a spare quantity of the available steam, it is preferable to reduce the flow rate of the cooling steam to the extent possible. Also, if less cooling steam is made, it becomes possible to control the temperature of the steam, after the steam is used for cooling, with less variation in the quantity of the cooling steam. Especially, if the temperature of the cooling steam heated during the cooling is maintained at a predetermined level, it will not only enhance the reliability and life of the cooled blade, rotor, pipings, etc. of the gas turbine, but it will also ensure an operation without damaging the enhanced combined efficiency. In order to reduce the quantity of the cooling steam, it is necessary to reduce the temperature of the cooling steam.

Thus, while the temperature of the cooling steam is necessary to be maintained lower to enhance the reliability of the cooled blade or the like, in the system shown in FIG. 26, the cooling steam supply temperature is determined by the outlet condition of the high pressure turbine 21, and it is difficult to further reduce the cooling steam temperature in this system.

Also, the air bled from the compressor for cooling the gas turbine blade is once cooled at the blade cooling air cooler 4 using the cooling fan 5 to be supplied into the turbine 6, as mentioned above, and the heat obtained by such cooling is discharged outside in vain. This causes a reduction in the thermal efficiency (gas turbine efficiency and combined efficiency) of the gas turbine and of a combined cycle system using this gas turbine. Moreover, the fuel 7 is supplied into the combustor 3 without being heated (preheated).

SUMMARY OF THE INVENTION

In view of the problems in the prior art, therefore, it is an object of the present invention to provide a steam cooled gas turbine system in which the system is made such that cooling of a turbine blade is done by a steam partially taken from an outlet of a high pressure turbine, and the temperature of this steam is adjusted by cooling water taken from a waste heat recovery boiler. A cooling steam supply system is made such that a moving blade, a stationary blade and a combustor transition piece are supplied with steam via their respective separate systems so that the steam supplied to the stationary blade and the combustor transition piece may be of a temperature higher than the steam supplied to the moving blade to thereby obtain a higher effect of the cooling by steam in the respective steam systems, and also so that preheating of fuel is done to thereby enhance the combined efficiency.

In order to achieve this object, the present invention provides the following, (1) A steam cooled gas turbine system comprises a steam turbine having a high pressure turbine, an intermediate pressure turbine, and a low pressure turbine; a condenser for condensing exhaust steam of the low pressure turbine of the steam turbine; a gas turbine having a compressor for compressing air, a combustor for combusting fuel with the air coming from the compressor, and a turbine for expanding a high temperature combustion gas coming from the combustor for driving a generator, a cooling steam system for cooling a higher temperature portion of the gas turbine including a high temperature portion of the combustor and a high temperature portion of a blade of the turbine; and a waste heat recovery boiler fed with exhaust gas from the gas turbine so as to heat and vaporize condensate water coming from the condenser for supplying steam to the high pressure, intermediate pressure and low pressure turbines, respectively. In the cooling steam system, a heat exchanger effects a heat exchange so that outlet steam from the high pressure turbine flowing through the heat exchanger is cooled and supplied into at least one of the high temperature portions of the gas turbine so as to be cooled, and is then recovered into the waste heat recovery boiler. Cooling water coming from the waste heat recovery boiler and flowing through the heat exchanger is heated and is then recovered into the waste heat recovery boiler.

(2) A steam cooled gas turbine system comprises: a steam turbine having a high pressure turbine, an intermediate pressure turbine, and a low pressure turbine; a condenser for condensing exhaust steam of the low pressure turbine of the steam turbine; a gas turbine having a compressor for compressing air, a combustor for combusting fuel with the air coming from the compressor, and a turbine for expanding a high temperature combustion gas coming from the combustor for driving a generator; a cooling steam system for cooling a high temperature portion of the gas turbine including a high temperature portion of the combustor and a high temperature portion of a blade of the turbine; and a waste heat recovery boiler fed with exhaust gas from the gas turbine so as to heat and vaporize condensed water coming from the condenser for supplying steam to the high pressure, intermediate pressure, and low pressure turbines, respectively. In the cooling steam system, a water sprayer supplies a high pressure water from the waste heat recovery boiler via a demineralizer into a passage for leading cooling steam from an outlet of the high pressure turbine into at least one of the high temperature portions of the gas turbine. A drain separator is interposed in a passage between the water sprayer and at least one of the high temperature portions. The cooling steam, from which drainage has been removed by the drain separator, is supplied into at least one of the high temperature portions for cooling thereof, and is then recovered into the waste heat recovery boiler.

(3) In the steam cooled gas turbine system mentioned in section (1) or (2), the high temperature portion of the gas turbine may be a moving blade.

(4) In the steam cooled gas turbine system mentioned in section (1) or (2), the high temperature portion of the gas turbine may be a stationary blade, and the steam heated by cooling the stationary blade can be recovered into the water heat recovery boiler.

(5) In the steam cooled gas turbine system mentioned in section (1) or (2), the high temperature portion of the gas turbine may be a combustor transition piece, and the steam heated by cooling the combustor transition piece can be recovered into the waste heat recovery boiler.

(6) In the steam cooled gas turbine system mentioned in section (1) or (2), the high temperature portion of the gas turbine may be a moving blade and a stationary blade, and the steam heated by cooling the stationary blade can be recovered into the waste heat recovery boiler.

(7) In the steam cooled gas turbine system mentioned in section (1) or (2), the high temperature portion of the gas turbine may be a moving blade, a stationary blade, and a combustor transition piece, and the steam heated by cooling the stationary blade and the combustor transition piece can be recovered into the waste heat recovery boiler.

(8) In the steam cooled gas turbine system mentioned in section (1) or (2), the high temperature portion of the gas turbine may be a stationary blade and a combustor transition piece, and the steam heated by cooling the stationary blade and the combustor transition piece can be recovered into the waste heat recovery boiler.

(9) In the steam cooled gas turbine system mentioned in any one of sections (1) to (8), the cooling steam system may have a flow regulating valve for regulating a flow rate of the steam so as to correspond to a cooling ability of the high temperature portion of the gas turbine.

(10) In the steam cooled gas turbine system mentioned in section (9), a fuel inflow passage of the combustor of the gas turbine has a fuel heater for heating fuel using steam coming from the waste heat recovery boiler, and the steam cooled by heating the fuel can be recovered into a feed water heater. A portion of the outlet water from the feed water heater flows through a blade cooling air cooler for cooling blade cooling air of the turbine, and the water heated by cooling the blade cooling air can be recovered into the waste heat recovery boiler.

(11) A steam cooled gas turbine system comprises: a steam turbine having a high pressure turbine, an intermediate pressure turbine, and a low pressure turbine; a condenser for condensing exhaust steam of the low pressure turbine of the steam turbine; a gas turbine; a gas turbine having a compressor for compressing air, a combustor for combusting fuel with the air coming from the compressor, and a turbine for expanding a high temperature combustion gas coming from the combustor for driving a generator; a cooling steam system for cooling the combustor and a blade of the turbine; and a waste heat recovery boiler having components of a feed water heater, an intermediate pressure economizer, a first high pressure economizer, a second high pressure economizer, a low pressure superheater, an intermediate pressure superheater, a high pressure superheater, a high pressure evaporator, and a reheater, and being fed with exhaust gas from the gas turbine so that condensed water coming from the condenser may be heated and vaporized via the components of the waste heat recovery boiler for supplying steam to the high pressure, intermediate pressure and low pressure turbines, respectively. The cooling steam system has a heat exchanger for effecting a heat exchange so that outlet steam from the high pressure turbine flowing through the heat exchanger is cooled and supplied into a moving blade of the gas turbine for cooling thereof. The steam is then recovered into the reheater, and cooling water coming from the first high pressure economizer and flowing through the heat exchanger is heated and is then recovered into the high pressure evaporator.

(12) A steam cooled gas turbine system comprises: a steam turbine having a high pressure turbine, an intermediate pressure turbine, and a low pressure turbine; a condenser for condensing exhaust steam from the low pressure turbine of the steam turbine; a gas turbine having a compressor for compressing air, a combustor for combusting fuel with the air coming from the compressor, and a turbine for expanding a high temperature combustion gas coming from the combustor for driving a generator; a cooling steam system for cooling the combustor and a blade of the turbine; and a waste heat recovery boiler having components of a feed water heater, an intermediate pressure economizer, a first high pressure economizer, a second high pressure economizer, a low pressure superheater, an intermediate pressure superheater, a high pressure superheater, a high pressure evaporator, and a reheater. The waste heat recovery boiler is fed with exhaust gas from the gas turbine so that condensed water coming from the condenser may be heated and vaporized via the components of the waste heat recovery boiler for supplying steam to the high pressure, intermediate pressure and low pressure turbines, respectively. The cooling steam system has a water spray rate control valve for leading high pressure water from the feed water heater. A demineralizer is connected to the water spray rate control valve, a water sprayer is connected to the demineralizer for spraying the high pressure water into a passage for leading cooling steam from an outlet of the high pressure turbine to be supplied into a moving blade of the gas turbine, and a drain separator is interposed in a passage between the water sprayer and the moving blade. The cooling steam, from which drainage has been removed by the drain separator, is supplied into the moving blade for cooling thereof and is then recovered into the reheater.

(13) A steam cooled gas turbine system comprises: a steam turbine having a high pressure tubing, an intermediate pressure turbine, and a low pressure turbine; a condenser for condensing exhaust steam from the low pressure turbine of the steam turbine; a gas turbine having a compressor for compressing air, a combustor for combusting fuel with the air coming from the compressor, and a turbine for expanding a high temperature combustion gas coming from the combustor for driving a generator; a cooling system for cooling the combustor and a blade of the turbine; and a waste heat recovery boiler having components of a feed water heater, an intermediate pressure economizer, a first high pressure economizer, a second high pressure economizer, a low pressure superheater, an intermediate pressure superheater, a high pressure superheater, a high pressure evaporator, and a reheater. The waste heat recovery boiler is fed with exhaust gas from the gas turbine so that condensed water coming from the condenser may be heated and vaporized via the components of the waste heat recovery boiler for supplying steam to the high pressure, intermediate pressure, and low pressure turbines, respectively. The cooling steam system has a water spray rate control valve for leading a high pressure water from the feed water heater. A demineralizer is connected to the water spray rate control valve, a water sprayer is connected to the demineralizer for spraying the high pressure water into a passage for leading cooling steam from an outlet to the high pressure turbine to be supplied into a moving blade of the gas turbine. A drain separator is interposed in a passage between the water sprayer and the moving blade, and the cooling steam, from which drainage has been removed by the drain separator, is supplied into the moving blade for cooling thereof and is then recovered into the reheater. A heat exchange side flow regulating value is provide near a steam inlet of the reheater in the outlet steam piping of the high pressure turbine connected to the steam inlet of the reheater and an outflow side flow regulating valve in a cooling steam outlet passage of each moving blade, a stationary blade, and a combustor transition piece. A fuel inflow passage of the combustor has a fuel heater for heating fuel by outlet steam of the intermediate pressure economizer, and the steam cooled by heating the fuel is recovered into the feed water heater. A portion of the outlet water from the feed water heater flows through a blade cooling air cooler for cooling blade cooling air of the turbine, and the water heated by cooling the blade cooling air is recovered into the high pressure evaporator.

In section (1), a portion of the high pressure turbine outlet steam is extracted to be used as a cooling steam. This steam is cooled at the heat exchanger to then be supplied into the high temperature portion of the gas turbine. The steam heated by so cooling the high temperature portion of the gas turbine is recovered into the waste heat recovery boiler. On the other hand, for cooling the steam at the heat exchanger, a portion of the water from the waste heat recovery boiler is removed as cooling water to be supplied into the heat exchanger. This water heated by cooling the steam is recovered into an inlet side, or a high temperature side, of the waste heat recovery boiler. In a system in which the heat given to the cooling water at the heat exchanger is discharged outside, the combined efficiency is reduced. However, in section (1), this heat given to the cooling water is recovered into the high temperature side of the waste heat recovery boiler. Thus, without the combined efficiency being hurt, reduction of the temperature of the cooling steam for cooling the high temperature portion of the gas turbine can be obtained. Thus, according to the system of the present invention, while the combined efficiency is in no case reduced, the reduction in the supply temperature and supply quantity of the cooling steam becomes possible. Moreover, the temperature of the steam, after being used for the cooling, can be controlled with less variation in the quantity of the cooling steam. Hence, a spare quantity of the available steam is ensured, and the reliability and life elongation of the cooled blade, rotor, and pipings can be ensured.

In section (2), the system is constructed such that the heat exchanger used in section (1) is eliminated, and instead a water spraying device, including the water spray rate control valve, the demineralizer, the water sprayer and the drain separator, for spraying water taken from the waste heat recovery boiler, is employed. By such construction, the water spray rate is controlled by the water spray rate control valve, and control of the supply temperature of the cooling steam for cooling the high temperature portion of the gas turbine can be done more quickly than in section (1). The demineralizer is a type that is usually used for removing dissolved minerals in the condenser of a supercritical pressure plant or a nuclear plant, and impurities in the water are removed by the demineralizer. Also, the drain separator is used for separating drainage that is generated in a small quantity after the water is sprayed into the steam by the water sprayer so that the cooling steam, from which drainage has been removed, is supplied for the cooling. Thus, a quicker reduction in the supply temperature and supply quantity of the cooling steam of the gas turbine high temperature portion becomes possible. Also, the temperature of the steam, after being used for cooling, can be controlled with less variation in the quantity of the cooling steam. Hence, a spare quantity of the available steam is ensured, and the reliability and life elongation of the cooled blade, rotor, and pipings can be ensured.

In sections (3) to (8), the respective high temperature portions of the gas turbine to be cooled in sections (1) to (2) are selected as follows: the moving blade only in section (3), the stationary blade only in section (4), the combustor transition piece only in section (5), the moving blade and stationary blade in section (6), the moving blade, stationary blade and combustor transition piece in section (7), and the stationary blade and combustor transition piece in section (8). Thus, the respective portions of the gas turbine are cooled and, like in section (1) or (2), reduction in the respective supply temperature and supply quantity of the cooling steam becomes possible. Also, the temperature of the steam, after being used for the cooling, can be controlled with less variation in the quantity of the cooling steam. Hence, a spare quantity of the available steam is ensured, and the reliability and life elongation of the cooled blade, rotor and pipings can be ensured.

In section (9), a flow regulating valve is provided at each appropriate position in the cooling steam system and, by opening and closing the valves, the supply temperature of the cooling steam for cooling the gas turbine high temperature portion becomes controllable at any load state from the rated load to the partial load. Thus, the supply temperature of the cooling steam becomes controllable without changing the supply quantity of the cooling steam, and the reliability and life elongation of the cooled blade, rotor, and pipings can be ensured. Also, control of the respective recovery steam temperature becomes possible, so that the reliability and life elongation of the cooled blade, rotor, and pipings can be ensured. In each of the flow regulating valves, if the valve is opened, the supply quantity of the cooling steam is increased and the recovery temperature of the cooling steam is reduced. If the valve is closed, the supply quantity of the cooling steam is reduced and the recovery temperature of the cooling steam is elevated. In the construction using the water spray rate control valve, demineralizer, water sprayer and drain separator, the water spray rate is controlled by the water spray rate control valve and, by adding the flow regulating valves to this construction, a quick control of the supply temperature of the cooling steam to be supplied into the gas turbine high temperature portion becomes possible. Also, as described with respect to section (2), a quick reduction in the supply temperature and supply quantity of the cooling steam becomes possible, and the temperature of the steam, after it is used for cooling, can be controlled with less variation in the quantity of the cooling steam. Hence, a spare quantity of the available steam is ensured and the reliability and life elongation of the cooled blade, rotor, and pipings can be ensured.

In section (10), the fuel is heated at the fuel heater. Also, a portion of the water on an outlet side, or a low temperature side, of the waste heat recovery boiler is supplied into the blade cooling air cooler for effecting a heat exchange. At the blade cooling air cooler, the water cools the blade cooling air to be supplied into the gas turbine high temperature portion, and the water heated by cooling the air is then recovered into the waste heat recovery boiler. Thus, the heat that has been so far discharged outside by the cooling fan is recovered into the waste heat recovery boiler, and the combined efficiency is enhanced.

In section (11), in order to cool the steam cooled moving blade, a portion of the high pressure turbine outlet steam is extracted to be used as cooling steam for the steam cooled moving blade. This steam is cooled at the heat exchanger and then supplied into the steam cooled moving blade of the gas turbine. The steam heated by so cooling the moving blade is recovered into the middle portion of the reheater. On the other hand, for cooling the steam at the heat exchanger, a portion of the outlet water from the first high pressure economizer is taken as cooling water to be supplied into the heat exchanger. This water heated by so cooling the steam is recovered into an inlet of the high pressure evaporator. In a system in which the heat given to the cooling water at the heat exchanger is discharged outside, the combined efficiency is reduced. However, in section (11), this heat given to the cooling water is recovered into the inlet side, or the high temperature side, of the waste heat recovery boiler. Thus, without the combined efficiency being hurt, the temperature of the cooling steam for cooling the high temperature portion of the gas turbine can be reduced. Thus, according to the system of the present invention, while the combined efficiency is in no case reduced, the reduction in the supply temperature and supply quantity of the cooling steam becomes possible. Moreover, the temperature of the steam, after being used for the cooling, can be controlled with less variation in the quantity of the cooling steam. Hence, a spare quantity of the available steam is ensured, and the reliability and life elongation of the cooled blade, rotor, and pipings can be ensured.

In section (12), the system is constructed such that the heat exchanger as used in section (11) is eliminated, and instead a water spraying device, including the water spray rate control valve, the demineralizer, the water sprayer and the drain separator, for spraying water taken from the outlet water of the high pressure pump is employed. By such construction, the water spray rate is controlled by the water spray rate control valve, and control of the supply temperature of the cooling steam for cooling the moving blade of the gas turbine can be done more quickly than in section (11). The demineralizer is one that is typically used for removing dissolved minerals from the condenser of a supercritical pressure plant or a nuclear plant, and impurities in the water are removed by the demineralizer. Also, the drain separator is used for separating drainage that is generated in a small quantity after the water is sprayed into the steam by the water sprayer so that the cooling steam from which drainage has been removed is supplied for the cooling. Thus, as the feature of the present invention, a quicker reduction in the supply temperature and supply quantity of the cooling steam for cooling the moving blade becomes possible. Also, the temperature of the steam, after being used for cooling, can be controlled with less variation in the quantity of the cooling steam. Hence, a spare quantity of the available steam is ensured and the reliability and life elongation of the cooled blade, rotor, and pipings can be ensured.

In section (13), the heat exchanger is eliminated and instead, like in section (12), the water spray rate control valve, demineralizer, water sprayer and drain separator are employed. By such construction, the water spray rate is controlled by the water spray rate control valve, and a quicker control of the supply temperature of the moving blade cooling steam becomes possible. Also, by cooling the blade cooling air at the blade cooling air cooler, the moving blade is cooled efficiently and, as described with respect to section (12), the quicker reduction in the supply temperature and supply quantity of the moving blade cooling steam becomes possible. Further, by controlling the flow regulating valves, the flow rate of the steam can be controlled appropriately. Thus, the temperature of the steam, after being used for cooling, can be controlled with less variation in the quantity of the cooling steam. Hence, a spare quantity of the available steam is ensured, and the reliability and life elongation of the cooled blade, rotor, and pipings can be ensured.

DETAILED DESCRIPTION OF THE INVENTION

Here below, embodiments according to the present invention will be described concretely with reference to the figures.

Figure 1:
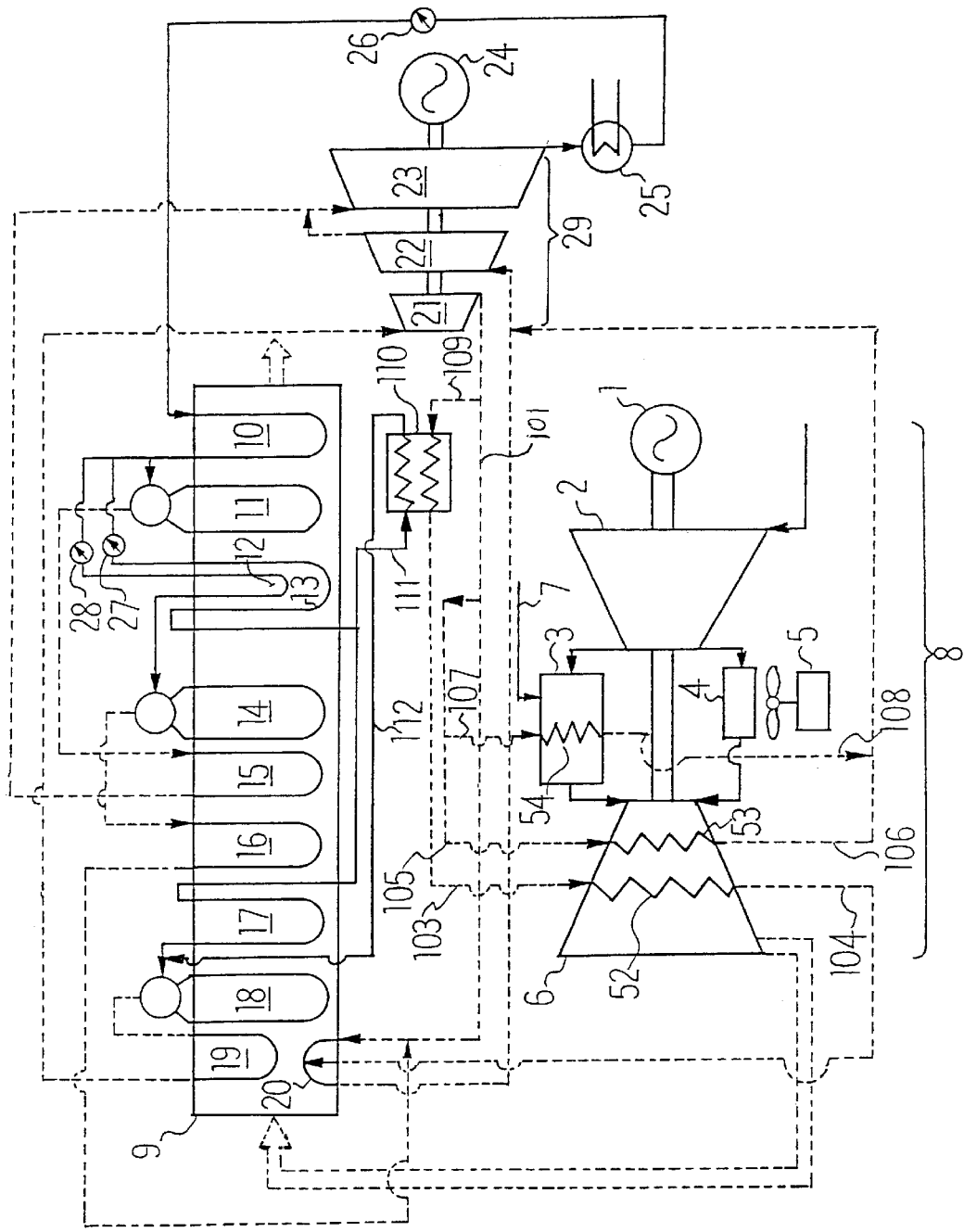
FIG. 1 is a diagram of a steam cooled gas turbine system of a first embodiment according to the present invention.

FIG. 1 is a diagram of a steam cooled gas turbine system of a first embodiment according to the present invention. In FIG. 1, the steam cooled gas turbine system of the first embodiment is constructed by a gas turbine 8, a waste heat recovery boiler 9 and a steam turbine 29. In the gas turbine 8, suction air is taken into a compressor 2 to be compressed to a predetermined pressure. While the compressed air is partially used for cooling a gas turbine blade, most of the compressed air is led into a combustor 3 to be mixed with fuel for generation of a high temperature gas. The high temperature gas enters a turbine 6 to expand and accomplish work and a turbine output after deduction of a compressor output is converted into electric power at a generator 1.

In the waste heat recovery boiler 9, outlet steam from a low pressure turbine 23 is converted into water from steam at a condenser 25. Then, the water is pressurized at a feed water pump 26 and heated at a feed water heater 10 to become saturated water. This saturated water is separated into three systems of water. The first system becomes saturated steam at a low pressure evaporator 11 and becomes superheated steam at a low pressure superheater 15, and is then supplied to an inlet of the low pressure turbine 23. The second system is pressurized to a predetermined pressure at an intermediate pressure pump 28, becomes saturated water at an intermediate pressure economizer 12, becomes saturated steam at an intermediate pressure evaporator 14, becomes superheated steam at an intermediate pressure superheater 16 and is then supplied to an inlet of a reheater 20. The third system is pressurized to a predetermined pressure at a high pressure pump 27, becomes saturated water at a first high pressure economizer 13 and a second high pressure economizer 17, becomes saturated steam at a high pressure evaporator 18, becomes superheated steam at a high pressure superheater 19, and is then led into a high pressure turbine 21. The mentioned superheated steam enters the high pressure turbine 21, an intermediate pressure turbine 22 and the low pressure turbine 23, respectively, to expand for generating an output, and this output is converted into electric power at a generator 24.

Figure 26:
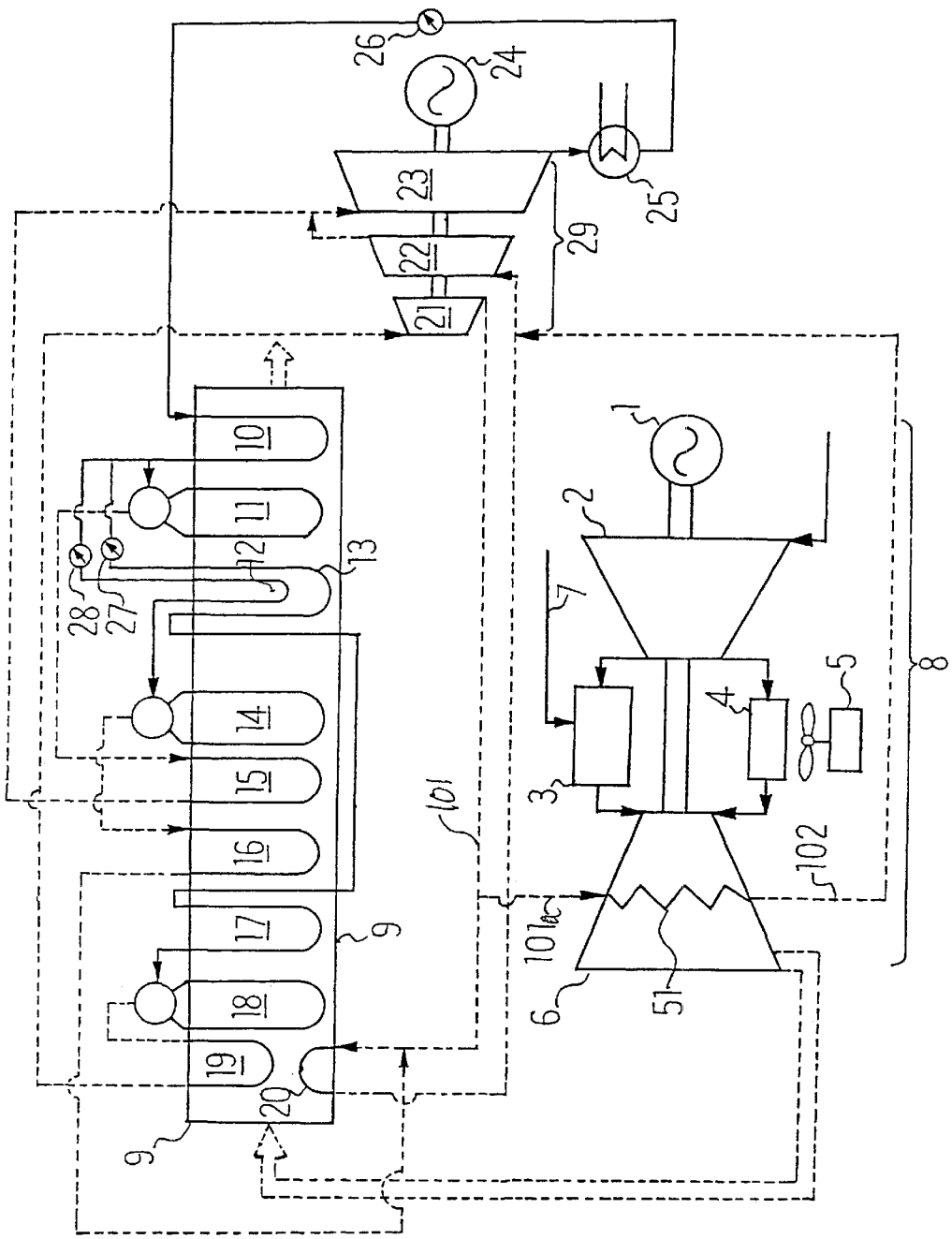
FIG. 26 is a diagram of a steam cooled gas turbine system in the prior art.

In the present embodiment of FIG. 1, the portion corresponding to the cooled blade 51 in the prior art shown in FIG. 26 is divided into a steam cooled moving blade 52, a steam cooled stationary blade 53, and a steam cooled combustor transition piece 54. As for the steam cooled moving blade 52, in which the temperature of the steam, after it is used for the cooling, is low, outlet steam of the high pressure turbine 21 flowing through piping 10 is partially extracted for cooling the steam cooled moving blade via piping 109 and is cooled at a heat exchanger 110 to be supplied into the steam cooled moving blade 52 via moving blade cooling steam supply piping 103. The steam heated by cooling the steam cooled moving blade 52 is recovered into a middle portion of the reheater 20 via a moving blade coding steam recovery piping 104. For the cooling of the moving blade cooling steam at the heat exchanger 110, cooled water is partially taken from an outlet of the first high pressure economizer 13 and is supplied into the heat exchanger 110 via piping 111 to be used for cooling the moving blade cooling steam. The water heated at the heat exchanger 110 is supplied into an inlet of the high pressure evaporator 18 via piping 112.

In the present first embodiment constructed as described above, if the heat obtained by cooling the moving blade cooling steam at the heat exchanger 110 is discharged outside, then it will create a reduction in the combined efficiency. In the present first embodiment, however, the heat obtained at the heat exchanger 110 is recovered into the inlet of high pressure evaporator 18. By this arrangement, while there is no reduction in the combined efficiency, a reduction in the supply temperature and supply quantity of the moving blade cooling steam becomes possible. Moreover, the temperature of the steam, after being used for the cooling, can be controlled with less variation in the quantity of the cooling steam. Thus, a spare quantity of the available steam is ensured and the reliability and life elongation of the cooled blade, rotor, and pipings can be ensured.

As for the cooling of the steam cooled stationary blade 53 and the steam cooled combustor transition piece 54, steam extracted from the outlet steam of the high pressure turbine 21 is supplied into these components via stationary blade cooling steam supply piping 105 and combustor transition piece cooling steam supply piping 107, respectively. Numerals 106 and 108 designate stationary blade cooling steam recovery piping and a combustor transition piece cooling steam recovery piping, respectively. It is to be noted that reference numerals shown in FIG. 1 but not specifically described are the same as those of the prior art shown in FIG. 26.

Figure 2:
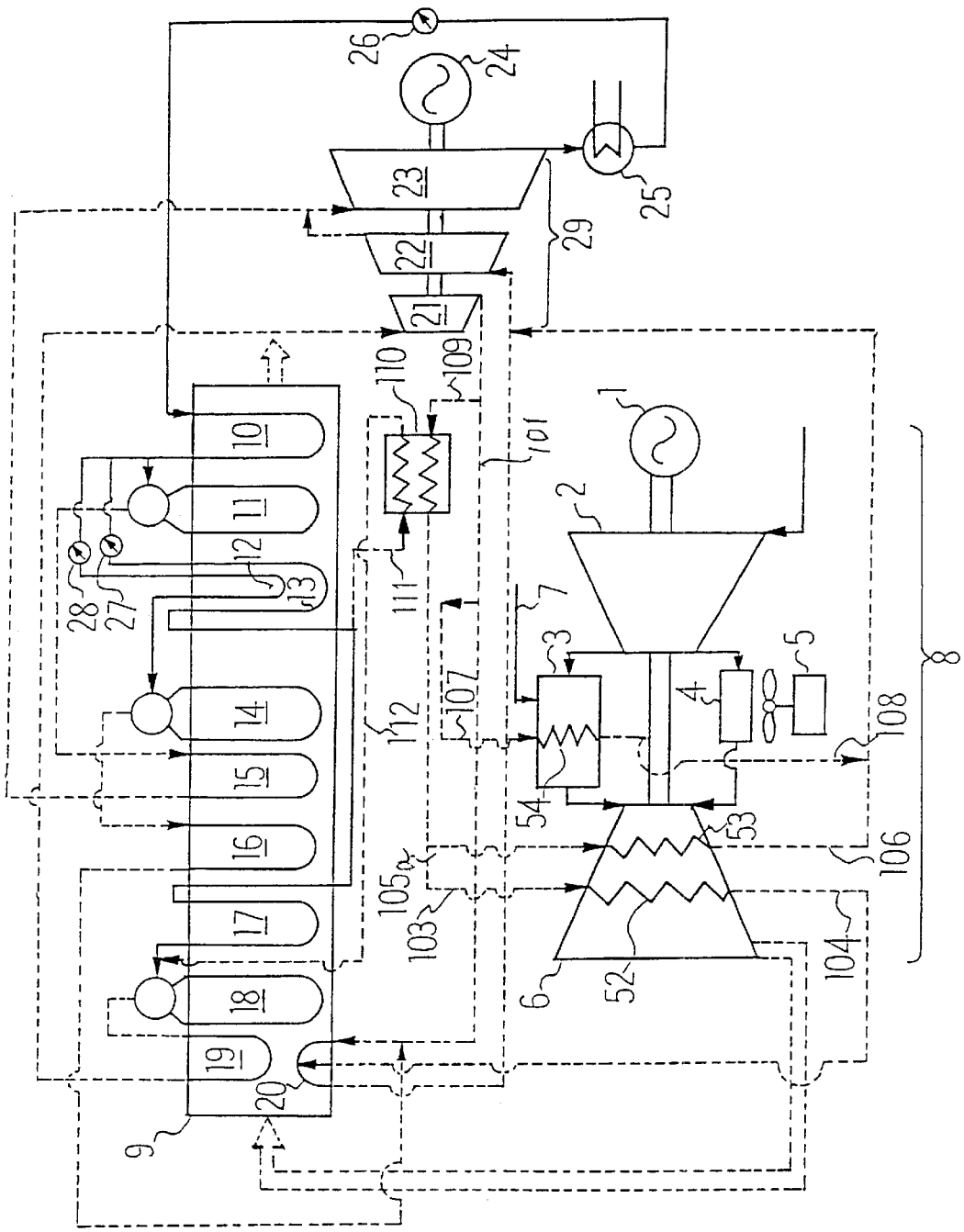
FIG. 2 is a diagram of a steam cooled gas turbine system of a second embodiment according to the present invention.

FIG. 2 is a diagram of a steam cooled gas turbine system of a second embodiment according to the present invention. In the present second embodiment, as compared with the first embodiment shown in FIG. 1 where the moving blade cooling steam only is cooled at the heat exchanger 110, the stationary blade cooling steam also flows through the heat exchanger 110 to be cooled there, and is then supplied into the steam cooled stationary blade 53 for cooling thereof via stationary blade cooling steam supply piping 105a.

By this arrangement, while there is no reduction in the combined efficiency, a reduction in the supply temperature and supply quantity of the stationary blade and moving blade cooling steam becomes possible. Also, the temperature of the steam, after being used for the cooling, can be controlled with less variation in the quantity of the cooling steam. Thus, a spare quantity of the available steam is ensured, and the reliability and life elongation of the cooled blade, rotor, and pipings can be ensured.

Figure 3:
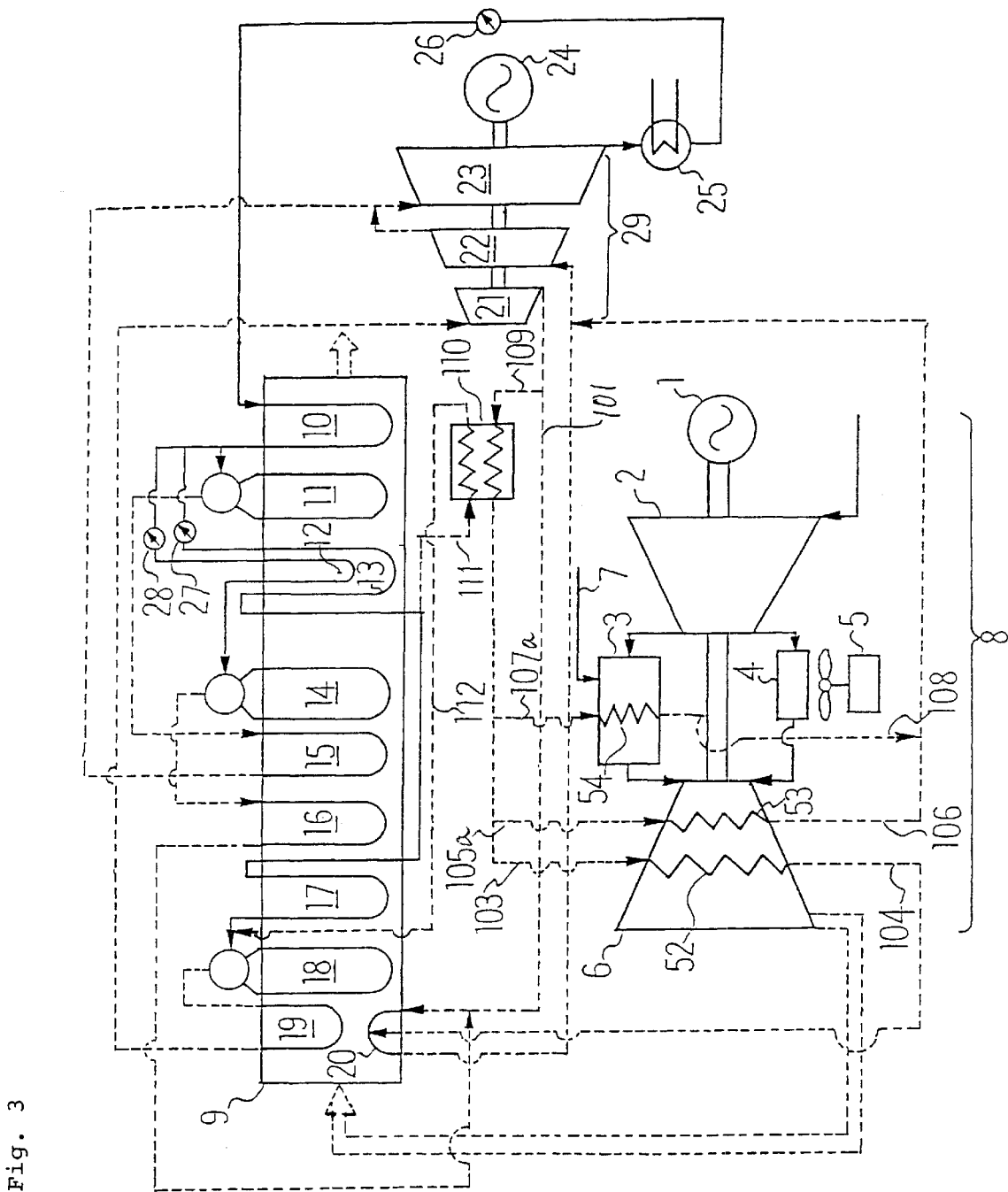
FIG. 3 is a diagram of a steam cooled gas turbine system of a third embodiment according to the present invention.

FIG. 3 is a diagram of a steam cooled gas turbine system of a third embodiment according to the present invention. In the third embodiment, as compared with the second embodiment shown in FIG. 2 where the moving blade and stationary blade cooling steam is cooled at the heat exchanger 110, the combustor transition piece cooling steam also flows through the heat exchanger 110 to be cooled there, and is supplied into the combustor transition piece 54 for cooling thereof via a combustor transition piece cooling steam supply piping 107a.

By this arrangement, while there is no reduction in the combined efficiency, a reduction in the cooling steam supply temperature and supply quantity of the combustor transition piece, stationary blade, and moving blade becomes possible. Also, the temperature of the steam, after being used for cooling, can be controlled with less variation in the quantity of the cooling steam. Thus, a spare quantity of the available steam is ensured and the reliability and life elongation of the cooled blade, rotor, and pipings can be ensured.

Figure 4:
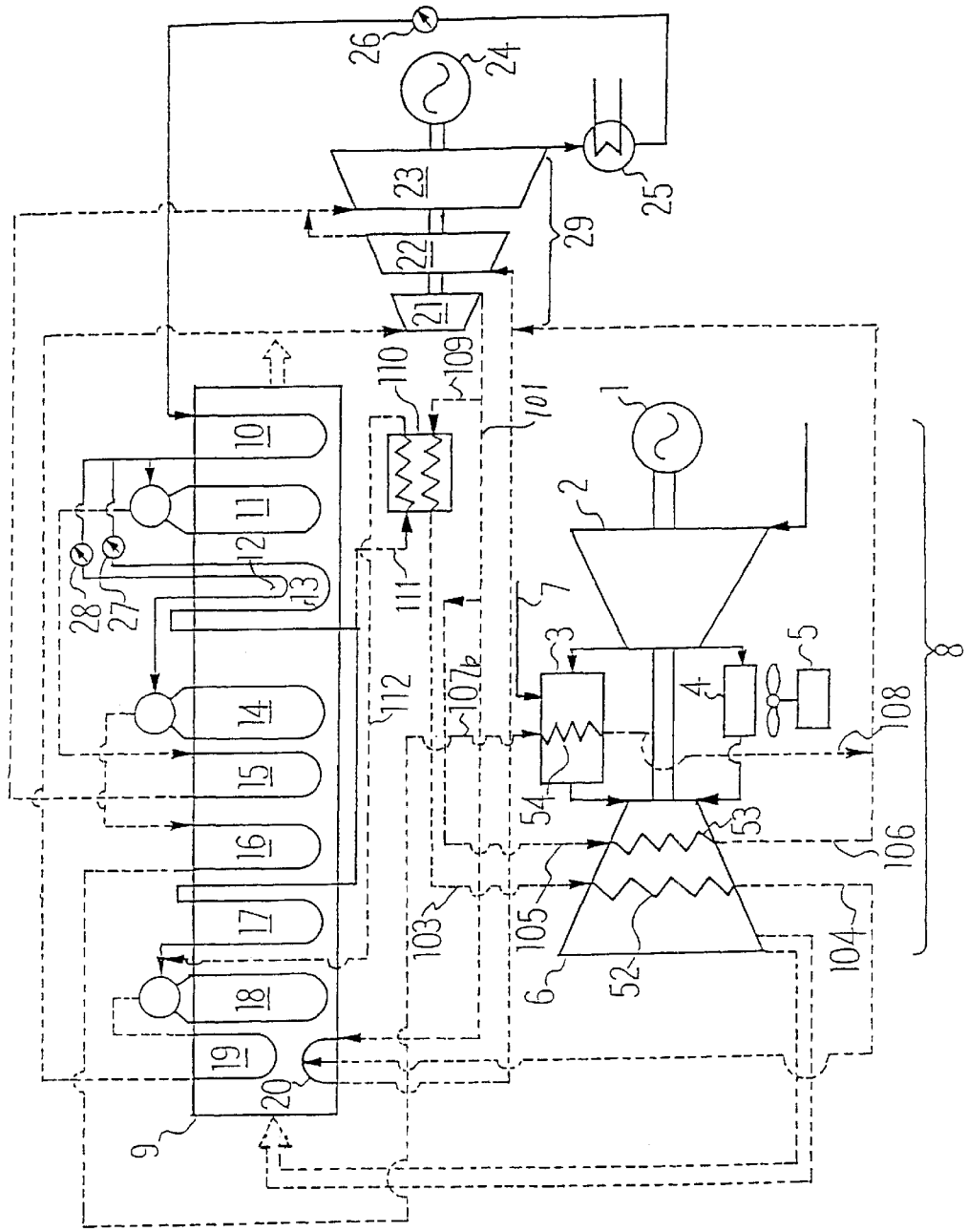
FIG. 4 is a diagram of a steam cooled gas turbine system of a fourth embodiment according to the present invention.

FIG. 4 is a diagram of a steam cooled gas turbine system of a fourth embodiment according to the present invention. In the present fourth embodiment, as compared with the first embodiment shown in FIG. 1 where the cooling steam for cooling the combustor transition piece 54 is taken from the outlet steam of the high pressure turbine 21, the cooling steam for cooling the combustor transition piece 54 is outlet steam from the intermediate pressure superheater 16 via combustor transition piece cooling steam supply piping 107b, and is recovered into an inlet of the intermediate pressure turbine 22.

By this arrangement, the flow rate of the cooling steam extracted from the outlet of the high pressure turbine 21 via the piping 109 is reduced by the flow rate of the cooling steam supplied through the piping 107b and thereby a spare quantity of the available steam can be ensured.

Figure 5:
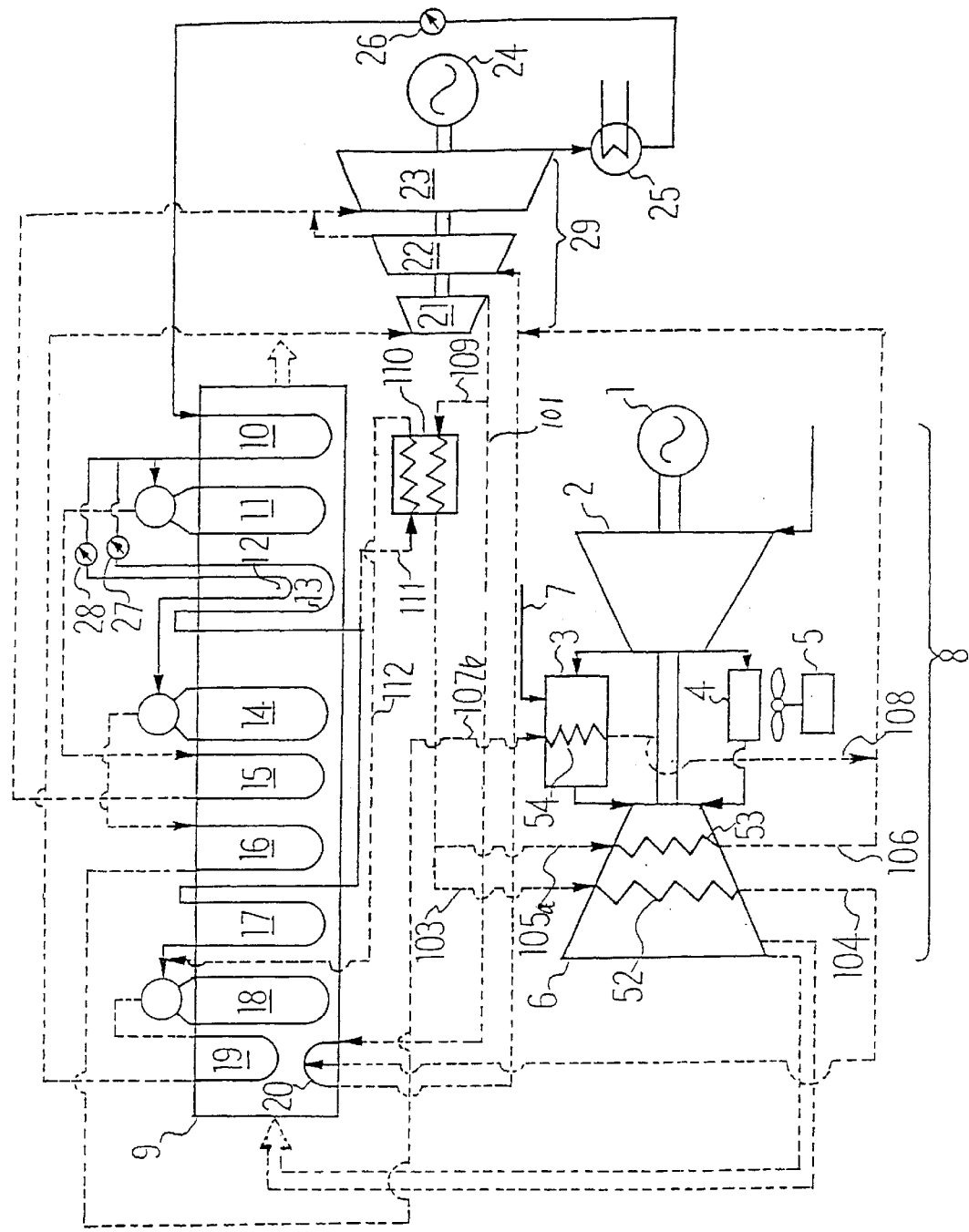
FIG. 5 is a diagram of a steam cooled gas turbine system of a fifth embodiment according to the present invention.

FIG. 5 is a diagram of a steam cooled gas turbine system of a fifth embodiment according to the present invention. In the present fifth embodiment, as compared with the third embodiment shown in FIG. 3 where the cooling steam for cooling the combustor transition piece 54 is taken from the outlet steam of the heat exchanger 110, the cooling steam for cooling the combustor transition piece 54 is taken from the outlet steam of the intermediate pressure superheater 16 via the combustor transition piece cooling steam supply piping 107b, and is recovered into the inlet of the intermediate pressure turbine 22.

By this arrangement, the flow rate of the cooling steam extracted from the outlet of the high pressure turbine 21 via the piping 109 is reduced by the flow rate of the cooling steam supplied through the piping 107b. Thus, a spare quantity of the available steam can be ensured.

It is to be noted that, in the first to fifth embodiments, while the cases where the cooling steam cooled at the heat exchanger 110 is used for cooling the moving blade 52 only (FIGS. 1 and 4), the moving blade 52 and stationary blade 53 (FIGS. 2 and 5) and the moving blade 52, stationary blade 53, and combustor transition piece 54 (FIG. 3) have been described, the cases are not limited thereto. For example, the cooling steam cooled at the heat exchanger 110 may be used for cooling the stationary blade 53 only, although not illustrated, and in this case, the same effect can be obtained.

Figure 6:
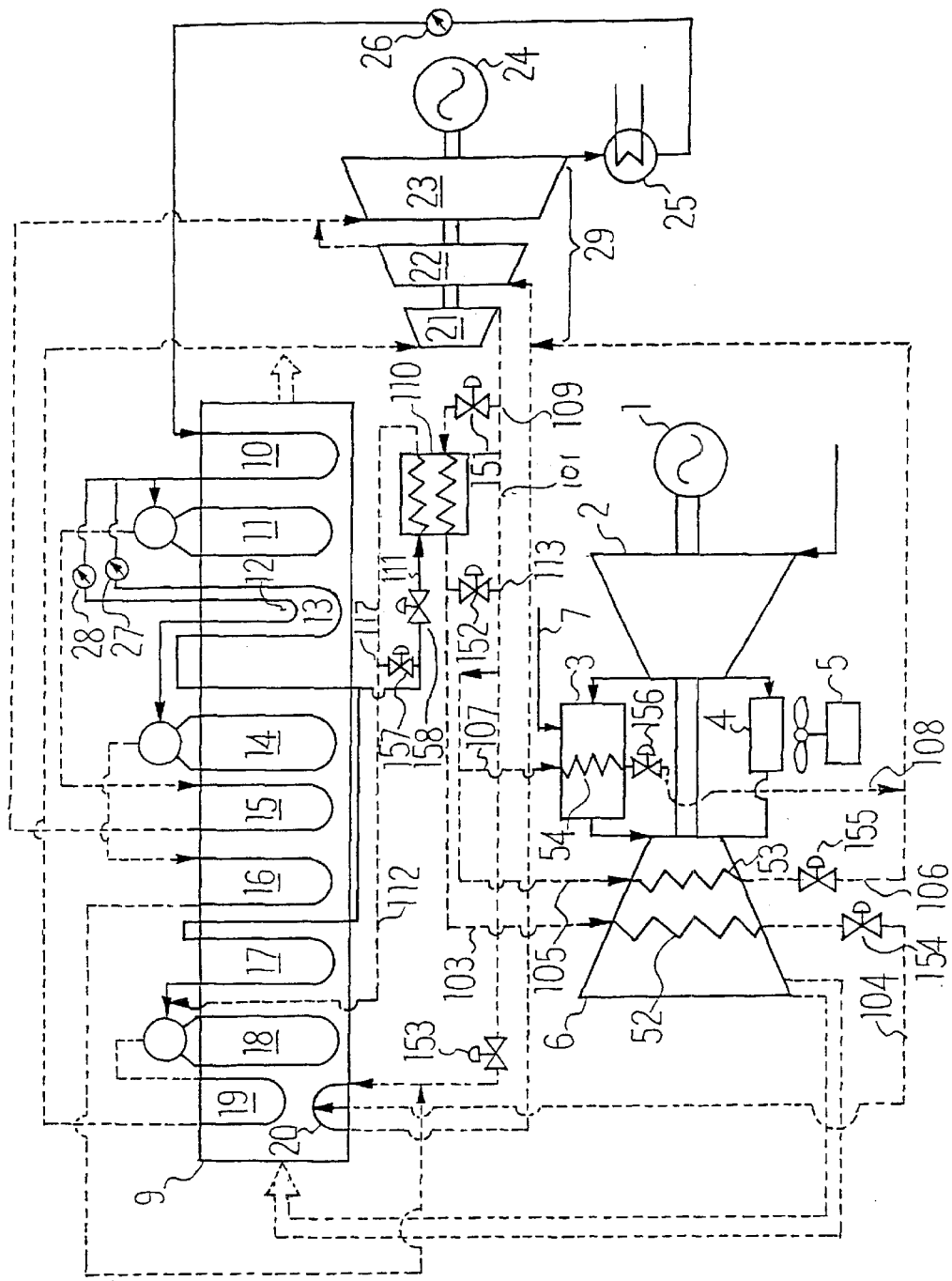
FIG. 6 is a diagram of a steam cooled gas turbine system of a sixth embodiment according to the present invention.

FIG. 6 is a diagram of a steam cooled gas turbine system of a sixth embodiment according to the present invention. In the present sixth embodiment, as compared with the first embodiment shown in FIG. 1, a flow regulating valve 151 is arranged in the piping 109, piping 113 connecting the pipe 101 and the piping 103, and a flow regulating valve 152 in the piping 113 are added. By opening and closing these valves 151, 152, the supply temperature of the moving blade cooling steam becomes adjustable in any load state from the rating to the partial load. Further, a piping 117 connecting the piping 111 and the piping 112, a flow regulating valve 157 in the piping 117, and a flow regulating valve 158 in the piping 111 are added. By opening and closing these valves 157, 158, the supply temperature of the moving blade cooling steam can be controlled quickly and securely.

By the above arrangement, the steam temperature at the outlet of the moving blade becomes adjustable without changing the flow rate of the steam supplied, and the reliability and life elongation of the moving blade, rotor, and pipings is ensured. In order to reduce the cooling steam temperature of the moving blade, the flow regulating valve 151 is opened and the flow regulating valve 152 is closed. Alternatively, the flow regulating valve 157 is closed and the flow regulating valve 158 is opened to thereby increase the cooled water flowing into the heat exchanger 110 so that the cooling steam temperature is reduced. Also, in order to elevate the cooling steam temperature of the moving blade, the flow regulating valve 151 is closed and the flow regulating valve 152 is opened. Alternatively, the flow regulating valve 157 is opened and the flow regulating valve 158 is closed so that thereby the cooled water flowing into the heat exchanger 110 is suppressed and the cooling steam temperature is elevated.

Moreover, as compared with the first embodiment shown in FIG. 1, a flow regulating valve 153 in the piping 101, a flow regulating valve 154 in the piping 104, a flow regulating valve 155 in the piping 106, and a flow regulating valve 156 in the piping 108 are added. By opening and closing these valves 153 to 156, the flow rate of the cooling steam of the moving blade, stationary blade and combustor transition piece becomes adjustable. Thus, not only in the rating time but also in the partial load time, the temperature of the respective recovery steam can be controlled, and there is obtained the effect to ensure the reliability and life elongation of the moving and stationary blades, combustor transition piece, rotor, and pipings. If the respective flow regulating valves are opened, the flow rate of the steam supplied increases and the temperature of the respective recovery steam is reduced. Also, if the respective flow regulating valves are closed, the flow rate of the steam supplied is reduced and the temperature of the respective recovery steam is elevated.

Figure 7:
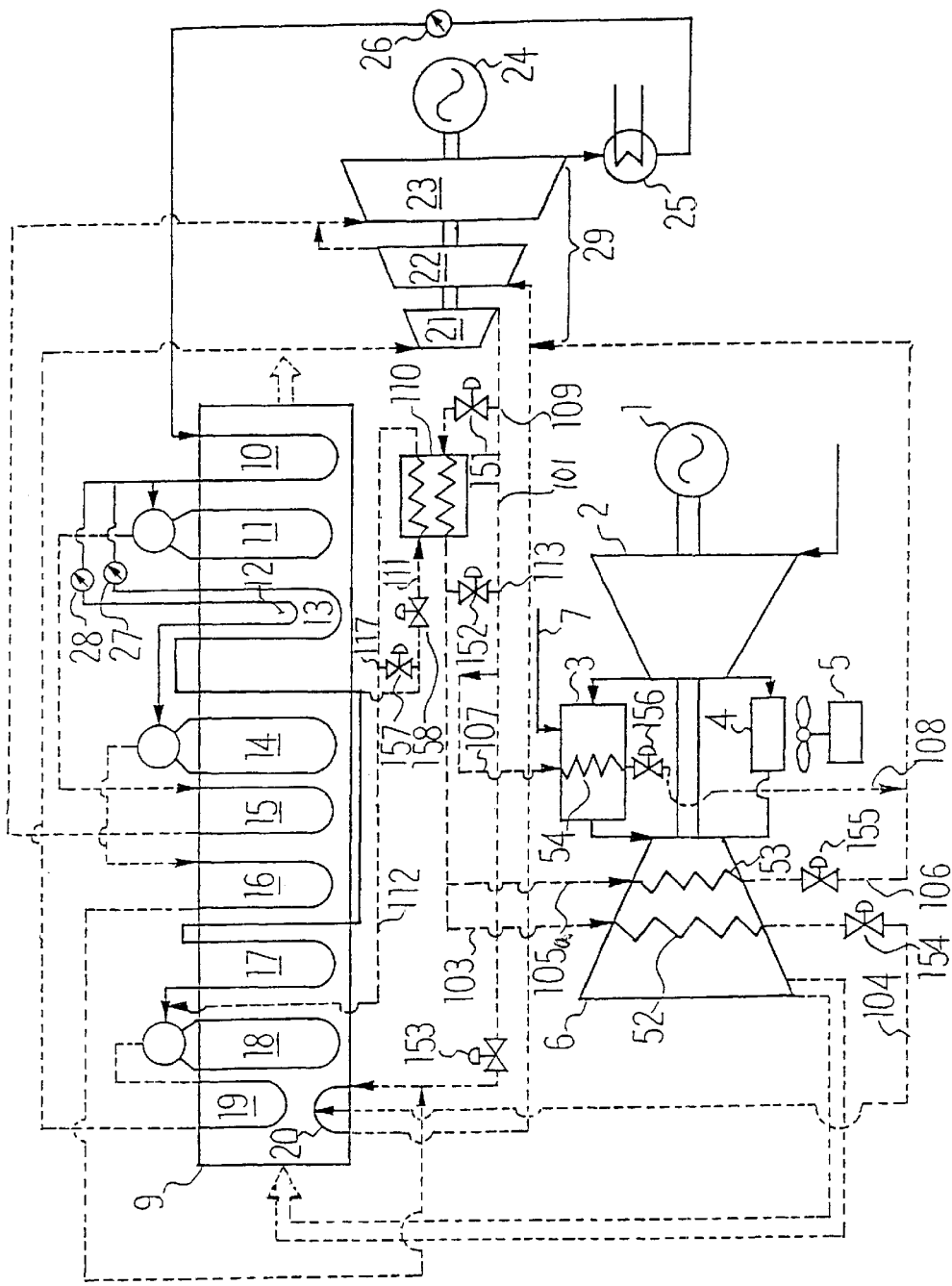
FIG. 7 is a diagram of a steam cooled gas turbine system of a seventh embodiment according to the present invention.

FIG. 7 is a diagram of a steam cooled gas turbine system of a seventh embodiment according to the present invention. In the present seventh embodiment, as compared with the second embodiment shown in FIG. 2, a flow regulating valve 151 in the piping 109, piping 113 connecting the piping 101 and the piping 103, and a flow regulating valve 152 in the piping 113 are added. By opening and closing these valves 151, 152, the supply temperature of the moving blade and stationary blade cooling steam becomes adjustable in any load state from the rating to the partial load. Further, piping 117 connecting the piping 111 and the piping 112, a flow regulating valve 157 in the piping 117, and a flow regulating valve 158 in the piping 111 are added. By opening and closing these valves 157, 158, the supply temperature of the moving blade and stationary blade cooling steam can be controlled quickly and securely.

By the above arrangement, the steam temperature at the outlets of the moving blade and stationary blade becomes adjustable without changing the flow rate of the steam supplied and the reliability and life elongation of the moving blade, stationary blade, rotor, and pipings is ensured. In order to reduce the cooling steam temperature of the moving blade and the stationary blade, the flow regulating valve 151 is opened and the flow regulating valve 152 is closed. Alternatively, the flow regulating valve 157 is closed and the flow regulating valve 158 is opened so that the cooled water flowing into the heat exchanger 110 is increased and the cooling steam temperature is reduced. Also, in order to elevate the cooling steam temperature of the moving blade and the stationary blade, the flow regulating valve 151 is closed and the flow regulating valve 152 is opened. Alternatively, the flow regulating valve 157 is opened and the flow regulating valve 158 is closed so that the amount of cooled water flowing into the heat exchanger 110 is suppressed and the cooling steam temperature is elevated.

Moreover, as compared with the second embodiment shown in FIG. 2, a flow regulating valve 153 in the piping 101, a flow regulating valve 154 in the piping 104, a flow regulating valve 155 in the piping 106, and a flow regulating valve 156 in the piping 108 are added. By opening and closing these valves 153 to 156, the flow rate of the cooling steam of the moving blade, stationary blade, and combustor transition piece becomes adjustable. Thus, not only in the rating time but also in the partial load time, the temperature of the respective recovery steam can be controlled and the reliability and life elongation of the moving and stationary blades, combustor transition piece, rotor, and pipings is ensured. If the respective flow regulating valves are opened, the flow rate of the steam supplied increases and the temperature of the respective recovery steam is reduced. Also, if the respective flow regulating valves are closed, the flow rate of the steam supplied is reduced and the temperature of the respective recovery steam is elevated.

Figure 8:
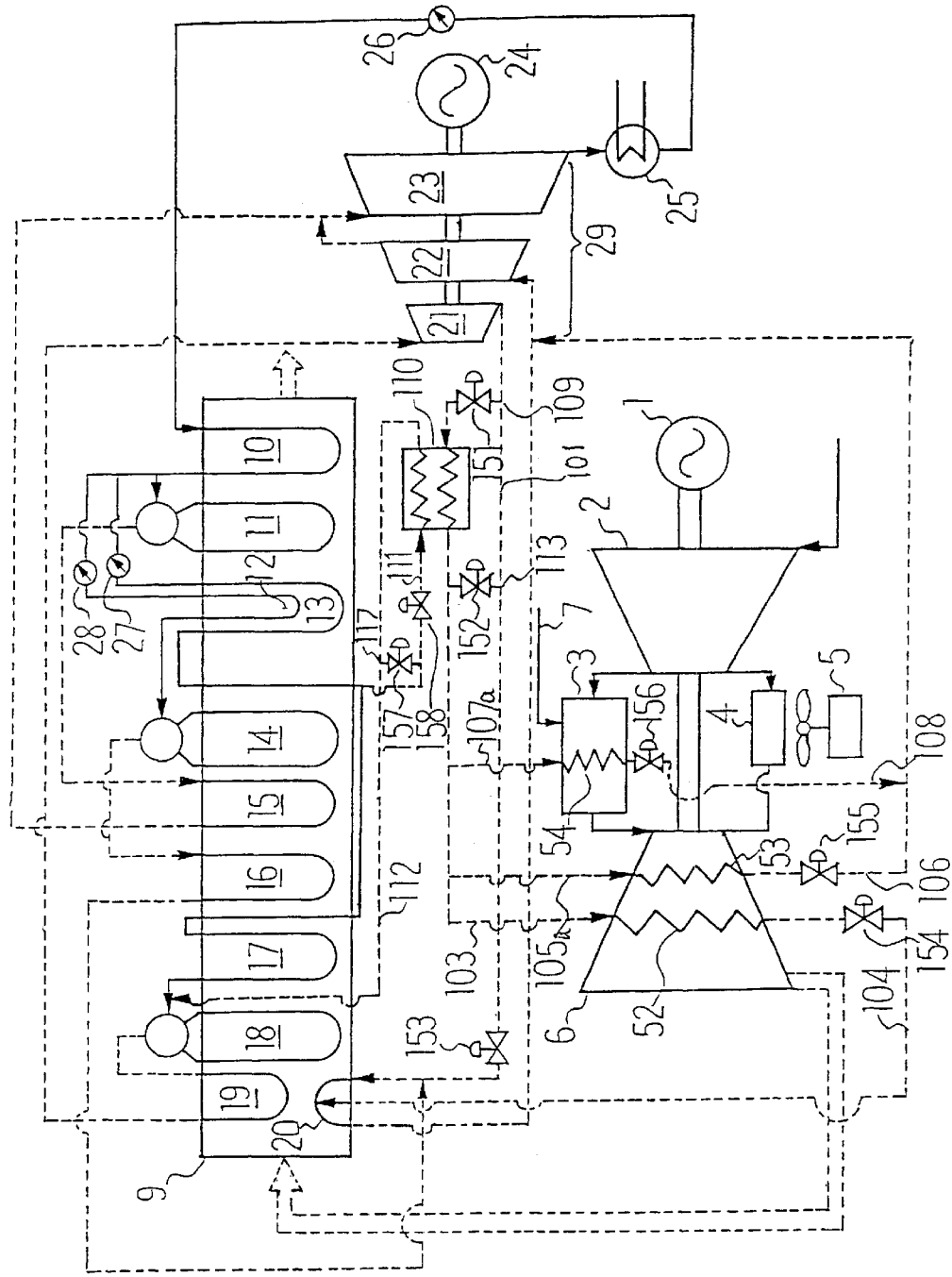
FIG. 8 is a diagram of a steam cooled gas turbine system of an eighth embodiment according to the present invention.

FIG. 8 is a diagram of a steam cooled gas turbine system of an eighth embodiment according to the present invention. In the present eighth embodiment, as compared with the third embodiment shown in FIG. 3, a flow regulating valve 151 in the piping 109, piping 113 connecting the piping 101 and the piping 103, and a flow regulating valve 152 in the piping 113 are added. By opening and closing these valves 151, 152, the supply temperature of the moving blade and stationary blade cooling steam and of the combustor transition piece cooling steam becomes adjustable in any load state from the rating to the partial load. Further, piping 117 connecting the piping 111 and the piping 112, a flow regulating valve 157 in the piping 117, and a flow regulating valve 158 in the piping 111 are added. By opening and closing these valves 157, 158, the supply temperature of the moving blade and stationary blade cooling steam and of the combustor transition piece cooling steam can be controlled quickly and securely.

By the above arrangement, the steam temperature at the outlets of the moving blade and the stationary blade, as well as of the combustor transition piece, becomes adjustable without changing the flow rate of the steam supplied, and the reliability and life elongation of the moving blade, stationary blade, combustor transition piece, rotor, and pipings are ensured. In order to reduce the cooling steam temperature of the moving blade and the stationary blade as well as the combustor transition piece, the flow regulating valve 151 is opened and the flow regulatring valve 152 is closed. Alternatively, the flow regulating valve 157 is closed and the flow regulating valve 158 is opened so that the cooled water flowing into the heat exchanger 110 is increased and the cooling steam temperature is reduced. Also, in order to elevate the cooling steam temperature of the moving blade and the stationary blade as well as the combustor transition piece, the flow regulating valve 151 is closed and the flow regulating valve 152 opened. Alternatively, the flow regulating valve 157 is opened and the flow regulating valve 158 is closed so that the cooled water flowing into the heat exchanger 110 is suppressed and the cooling steam temperature is elevated.

Moreover, as compared with the third embodiment shown in FIG. 3, a flow regulating valve 153 in the piping 101, a flow regulating valve 154 in the piping 104, a flow regulating valve 155 in the piping 106, and a flow regulating valve 156 in the piping 108 are added. By opening and closing these valves 153 to 156, the flow rate of the cooling steam of the moving blade, stationary blade and combustor transition piece becomes adjustable. Thus, not only in the rating time but also in the partial load time, the temperature of the respective recovery steam can be controlled and the reliability and life elongation of the moving and stationary blades, combustor transition piece, rotor, and pipings is ensured. If the respective flow regulating valves are opened, the flow rate of the steam supplied increases and the temperature of the respective recovery steam is reduced. Also, if the respective flow regulating valves are closed, the flow rate of the steam supplied is reduced and the temperature of the respective recovery steam is elevated.

Figure 9:
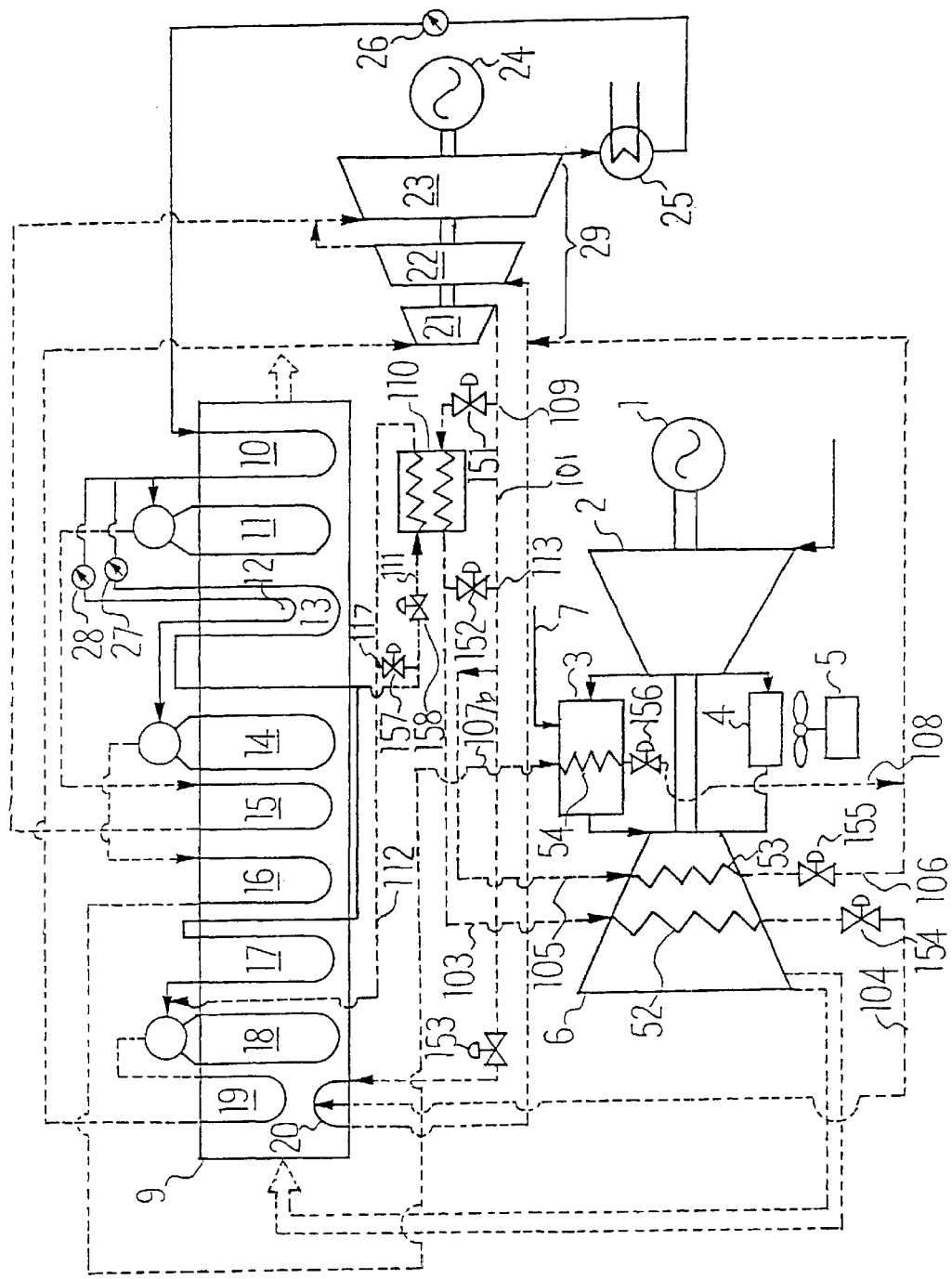
FIG. 9 is a diagram of a steam cooled gas turbine system of a ninth embodiment according to the present invention.

FIG. 9 is a diagram of a steam cooled gas turbine system of a ninth embodiment according to the present invention. In the present ninth embodiment, as compared with the fourth embodiment shown in FIG. 4, a flow regulating valve 151 in the piping 109, piping 113 connecting the piping 101 and the piping 103, and a flow regulating valve 152 in the piping 113 are added. By opening and closing these valves 151, 152, the supply temperature of the moving blade cooling steam becomes adjustable in any load state from the rating to the partial load. Further, a piping 117 connecting the piping 111 and the piping 112, a flow regulating valve 157 in the piping 117, and a flow regulating valve 158 in the piping 111 are added. By opening and closing these valves 157, 158, the supply temperature of the moving blade cooling steam can be controlled quickly and securely.

By the above arrangement, the steam temperature at the outlet of the moving blade becomes adjustable without changing the flow rate of the steam supplied, and the reliability and life elongation of the moving blade, rotor, and pipings is ensured. In order to reduce the cooling steam temperature of the moving blade, the flow regulating valve 151 is opened and the flow regulating valve 152 is closed. Alternatively, the flow regulating valve 157 is closed and the flow regulating valve 158 is opened so that the cooled water flowing into the heat exchanger 110 is increased and the cooling steam temperature is reduced. Also, in order to elevate the cooling steam temperature of the moving blade, the flow regulating valve 151 is closed and the flow regulating valve 152 is opened. Alternatively, the flow regulating valve 157 is opened and the flow regulating valve 158 is closed so that the cooled water flowing into the heat exchanger 110 is suppressed and the cooling steam temperature is elevated.

Moreover, as compared with the fourth embodiment shown in FIG. 4, a flow regulating valve 153 in the piping 101, a flow regulating valve 154 in the piping 104, a flow regulating valve 155 in the piping 106 and a flow regulating valve 156 in the piping 108 are added. By opening and closing these valves 153 to 156, the flow rate of the cooling steam of the moving blade, stationary blade and combustor transition piece becomes adjustable. Thus, not only in the rating time but also in the partial load time, the temperature of the respective recovery steam can be controlled and the reliability and life elongation of the moving and stationary blades, combustor transition piece, rotor, and pipings are ensured. If the respective flow regulating valves are opened, the flow rate of the steam supplied increases and the temperature of the respective recovery steam is reduced. Also, if the respective flow regulating valves are closed, the flow rate of the steam supplied is reduced and the temperature of the respective recovery steam is elevated.

Figure 10:
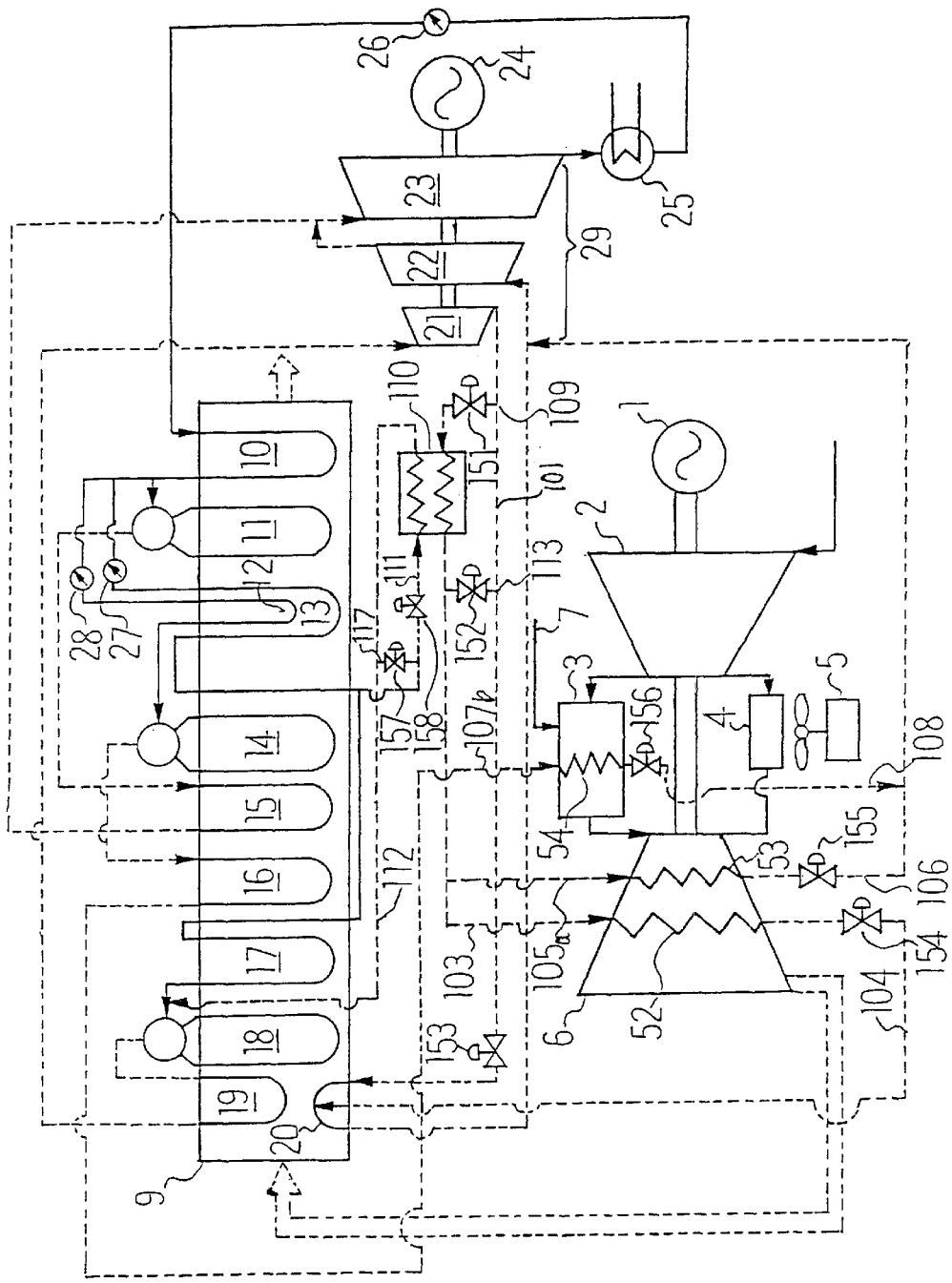
FIG. 10 is a diagram of a steam cooled gas turbine system of a tenth embodiment according to the present invention.

FIG. 10 is a diagram of a steam cooled gas turbine system of a tenth embodiment according to the present invention. In the present tenth embodiment, as compared with the fifth embodiment shown in FIG. 5, a flow regulating valve 151 in the piping 109, piping 113 connecting the piping 101 and the piping 103, and a flow regulating valve 152 in the piping 113 are added. By opening and closing these valves 151, 152, the flow rate of the moving blade and stationary blade cooling steam is held constant, and the supply temperature of the moving blade and stationary blade cooling steam becomes adjustable in any load state from the rating to the partial load. Further, piping 117 connecting the piping 111 and the piping 112, a flow regulating valve 157 in the piping 117, and a flow regulating valve 158 in the piping 111 are added. By opening and closing these valves 157, 158, the supply temperature of the moving blade and stationary blade cooling steam can be controlled quickly and securely.

By the above arrangement, the steam temperature at the outlets of the moving blade and the stationary blade becomes adjustable without changing the flow rate of the steam supplied, and the reliability and life elongation of the moving blade, stationary blade, rotor, and pipings are ensured. In order to reduce the cooling steam temperature of the moving blade and the stationary blade, the flow regulating valve 151 is opened and the flow regulating valve 152 is closed. Alternatively, the flow regulating valve 157 is closed and the flow regulating valve 158 is opened so that the cooled water flowing into the heat exchanger 110 is increased and the cooling steam temperature is reduced. Also, in order to elevate the cooling steam temperature of the moving blade and the stationary blade, the flow regulating valve 151 is closed and the flow regulating valve 152 opened. Alternatively, the flow regulating valve 157 is opened and the flow regulating valve 158 is closed so that the cooled water flowing into the heat exchanger 110 is suppressed and the cooling steam temperature is elevated.

Moreover, as compared with the fifth embodiment shown in FIG. 5, a flow regulating valve 153 in the piping 101, a flow regulating valve 154 in the piping 104, a flow regulating valve 155 in the piping 106, and a flow regulating valve 156 in the piping 108 are added. By opening and closing these valves 153 to 156, the flow rate of the cooling steam of the moving blade, stationary blade and combustor transition piece becomes adjustable. Thus, not only in the rating time but also in the partial load time, the temperature of the respective recovery steam can be controlled and the reliability and life elongation of the moving and stationary blades, combustor transition piece, rotor, and pipings are ensured. If the respective flow regulating valves are opened, the flow rate of the steam supplied increases and the temperature of the respective recovery steam is reduced. Also, if the respective flow regulating valves are closed, the flow rate of the steam supplied is reduced and the temperature of the respective recovery steam is elevated.

Figure 11:
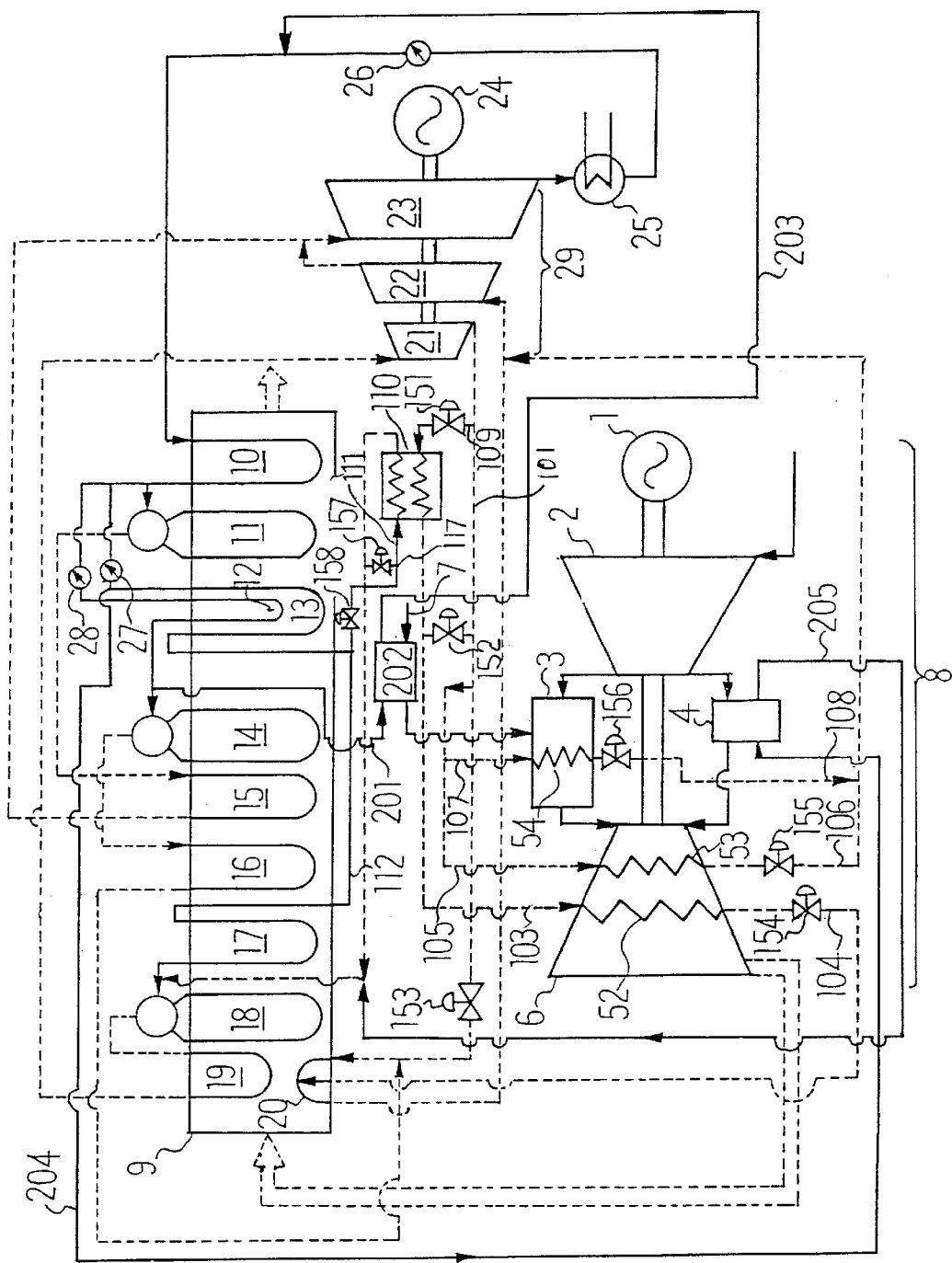
FIG. 11 is a diagram of a steam cooled gas turbine system of an eleventh embodiment according to the present invention.

FIG. 11 is a diagram of a steam cooled gas turbine system of an eleventh embodiment according to the present invention. In the present eleventh embodiment, as compared with the sixth embodiment shown in FIG. 6, saturated steam partially extracted from an outlet of the intermediate pressure economizer 12 flows through a fuel heater 202 via piping 201 so as to heat the fuel 7, and is then supplied to an inlet of the feed water heater 10 via piping 203. By this arrangement, the fuel 7 is heated and the flow rate of the fuel is reduced. Thus, the gas turbine efficiency and the combined efficiency are enhanced.

Also, as compared with the sixth embodiment shown in FIG. 6, outlet water from the high pressure pump 27 is partially supplied via piping 204 into the blade cooling air cooler 4. At the blade cooling air cooler 4, the water is heated by cooling air taken from the compressor 2 and the cooling air is cooled. The water is then recovered into an inlet of the high pressure evaporator 18. By this arrangement, the heat which has so far been discharged outside by the cooling fan is recovered into the waste heat recovery boiler 9, and the combined efficiency is enhanced.

Figure 12:
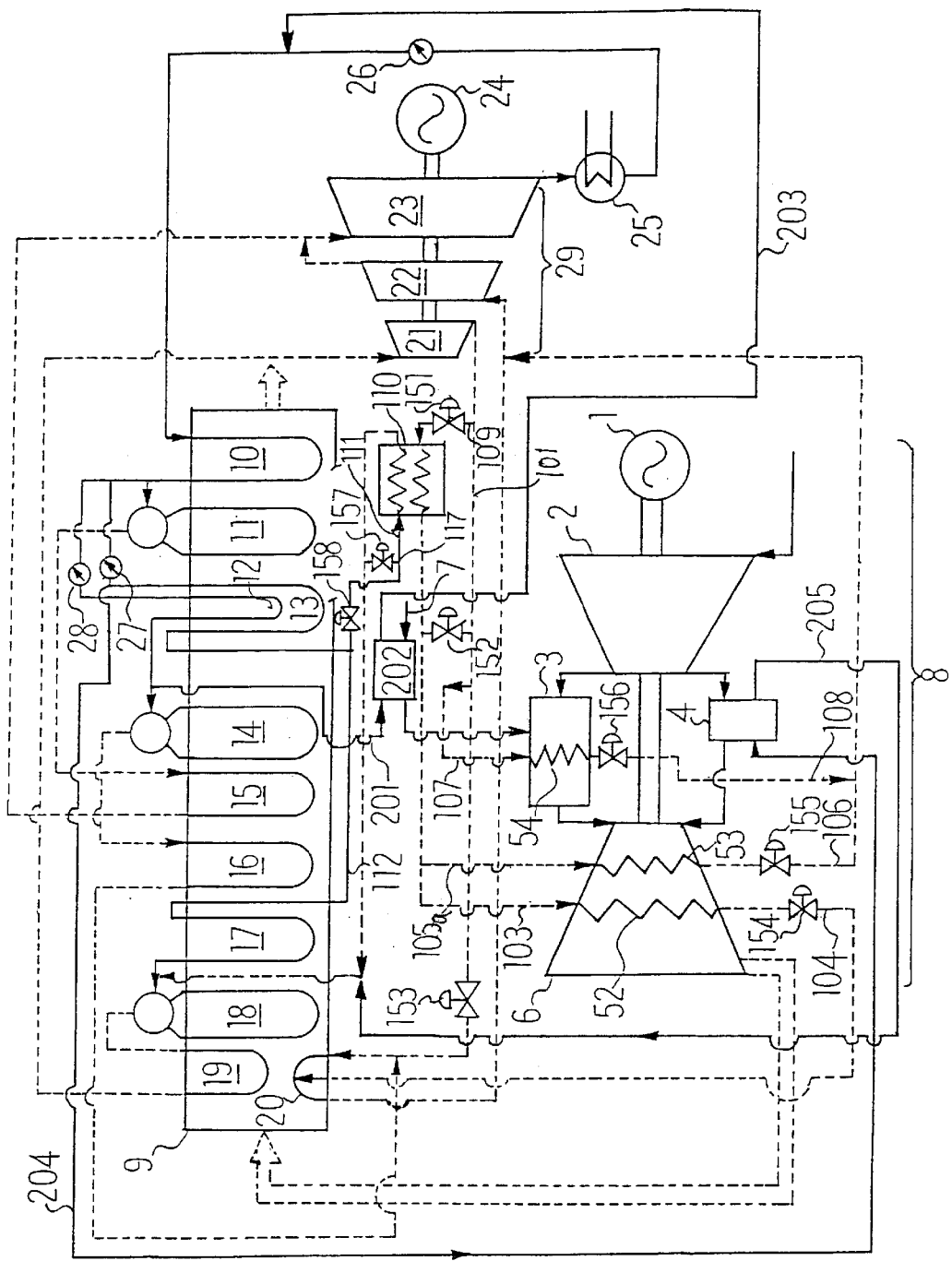
FIG. 12 is a diagram of a steam cooled gas turbine system of a twelfth embodiment according to the present invention.

FIG. 12 is a diagram of a steam cooled gas turbine system of a twelfth embodiment according to the present invention. In the present twelfth embodiment, as compared with the seventh embodiment shown in FIG. 7, saturated steam partially extracted from the outlet of the intermediate pressure economizer 12 flows through the fuel heater 202 via the piping 201 to heat the fuel 7, and is then supplied to the inlet of the feed water heater 10 via the piping 203. By this arrangement, the fuel 7 is heated and the flow rate of the fuel is reduced. Thus, the gas turbine efficiency and the combined efficiency are enhanced.

Also, as compared with the seventh embodiment shown in FIG. 7, outlet water from the high pressure pump 27 is partially supplied via the piping 204 into the blade cooling air cooler 4. At the blade cooling air cooler 4, the water is heated by cooling air taken from the compressor 2 and the cooling air is cooled. The water is then recovered into the inlet of the high pressure evaporator 18. By this arrangement, the heat which has so far been discharged outside in vain by the cooling fan is recovered into the waste heat recovery boiler 9, and the combined efficiency is enhanced.

Figure 13:
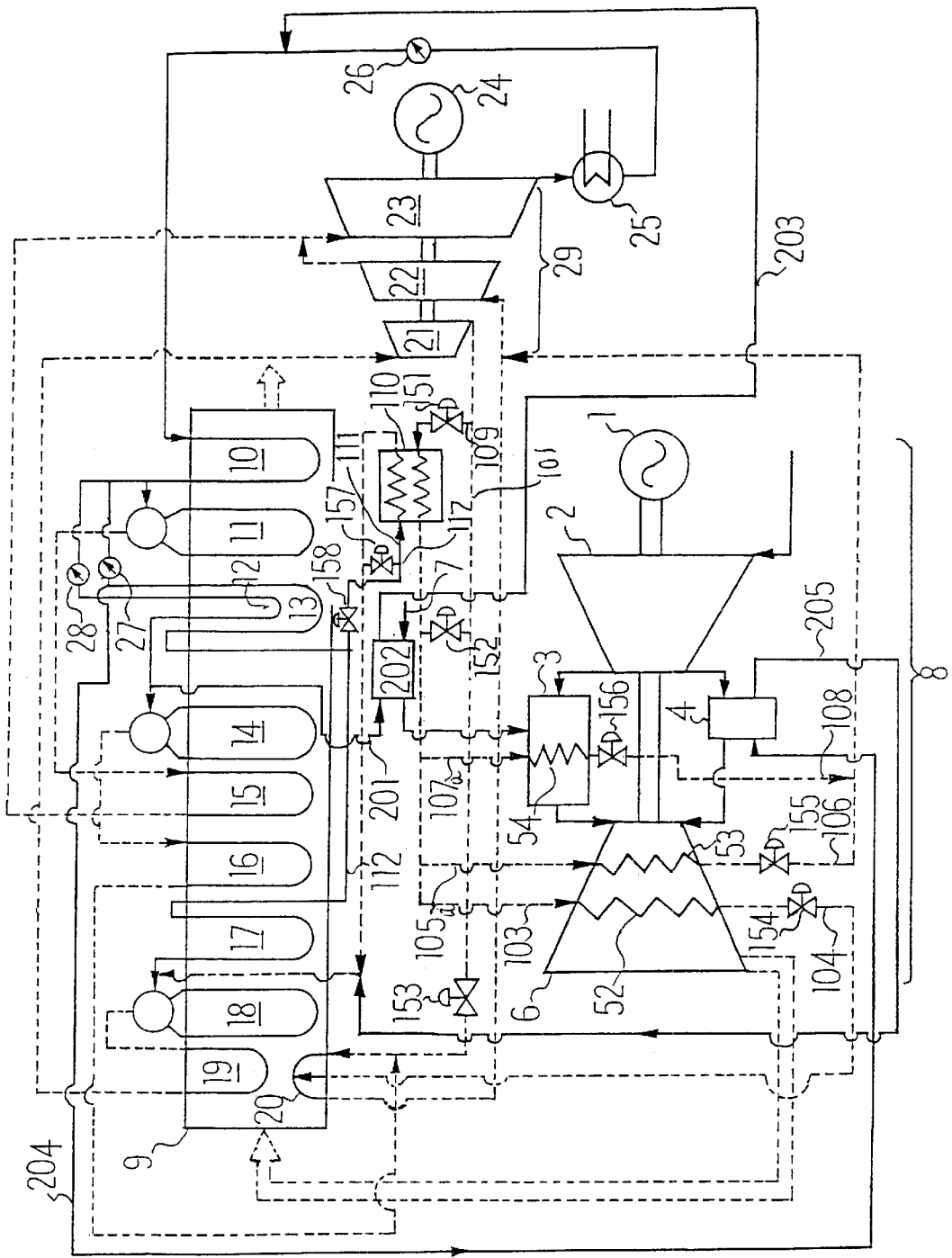
FIG. 13 is a diagram of a steam cooled gas turbine system of a thirteenth embodiment according to the present invention.

FIG. 13 is a diagram of a steam cooled gas turbine system of a thirteenth embodiment according to the present invention. In the present thirteenth embodiment, as compared with the eighth embodiment shown in FIG. 8, saturated steam partially extracted from the outlet of the intermediate pressure economizer 12 flows through the fuel heater 202 via the piping 201 to heat the fuel 7, and is then supplied to the inlet of the feed water heater 10 via the piping 203. By this arrangement, the fuel 7 is heated and the flow rate of the fuel is reduced. Thus, the gas turbine efficiency and the combined efficiency are enhanced.

Also, as compared with the eighth embodiment shown in FIG. 8, outlet water of the high pressure pump 27 is partially supplied via the piping 204 into the blade cooling air cooler 4. At the blade cooling air cooler 4, the water is heated by cooling air taken from the compressor 2 and the cooling air is cooled. The water is then recovered into the inlet of the high pressure evaporator 18. By this arrangement, the heat which has so far been discharged outside in vain by the cooling fan is recovered into the waste heat recovery boiler 9, and the combined efficiency is enhanced.

Figure 14:
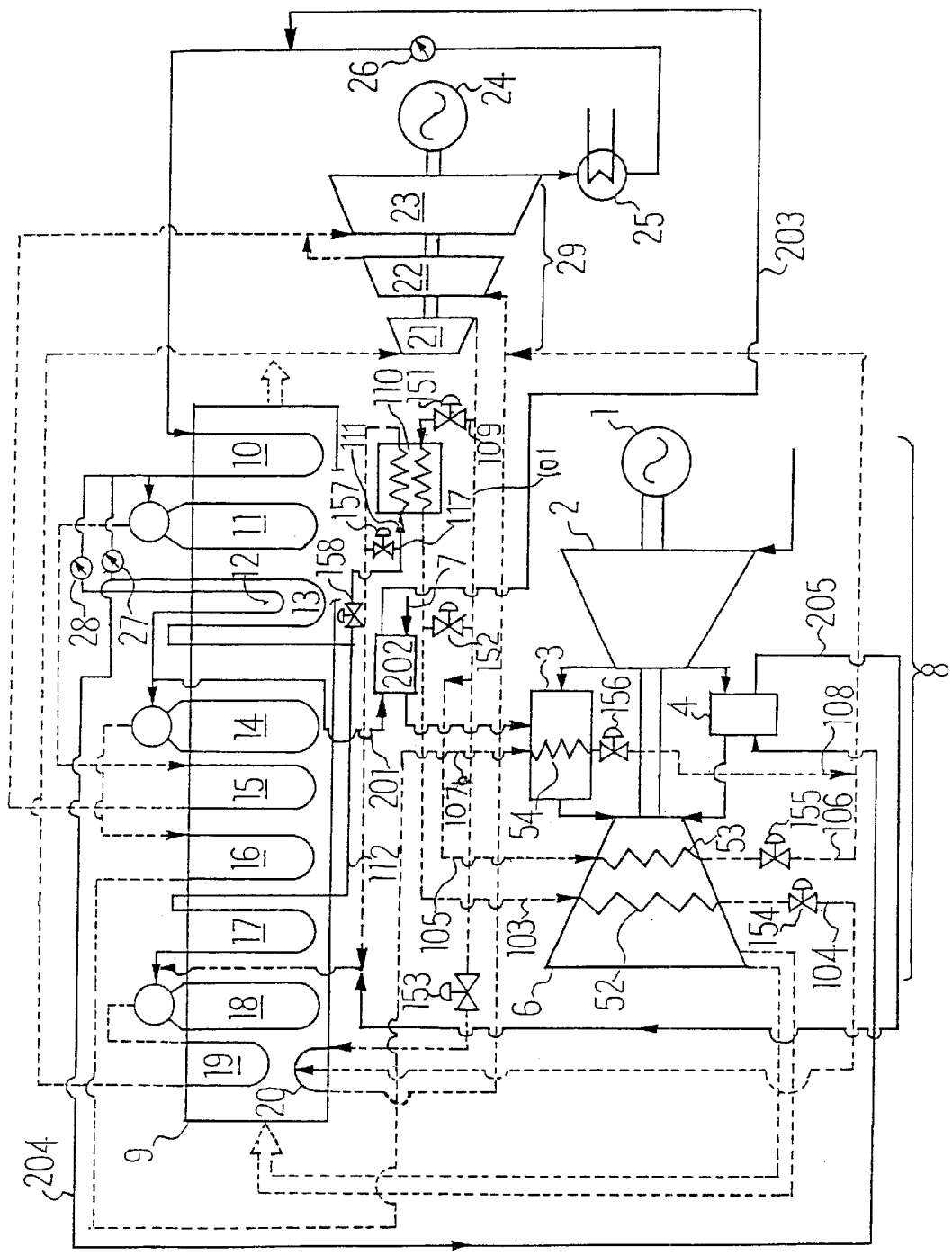
FIG. 14 is a diagram of a steam cooled gas turbine system of a fourteenth embodiment according to the present invention.

FIG. 14 is a diagram of a steam cooled gas turbine system of a fourteenth embodiment according to the present invention. In the present fourteenth embodiment, as compared with the ninth embodiment shown in FIG. 9, saturated steam partially extracted from the outlet of the intermediate pressure economizer 12 flows through the fuel heater 202 via the piping 201 to heat the fuel 7 and is then supplied to the inlet of the feed water heater 10 via the piping 203. By this arrangement, the fuel 7 is heated and the flow rate of the fuel is reduced. Thus, the gas turbine efficiency and the combined efficiency are enhanced.

Also, as compared with the ninth embodiment shown in FIG. 9, outlet water of the high pressure pump 27 is partially supplied via the piping 204 into the blade cooling air cooler 4. At the blade cooling air cooler 4, the water is heated by cooling air taken from the compressor 2 and the cooling air is cooled. The water is then recovered into the inlet of the high pressure evaporator 18. By this arrangement, the heat which has so far been discharged outside in vain by the cooling fan is recovered into the waste heat recovery boiler 9, and the combined efficiency is enhanced.

Figure 15:
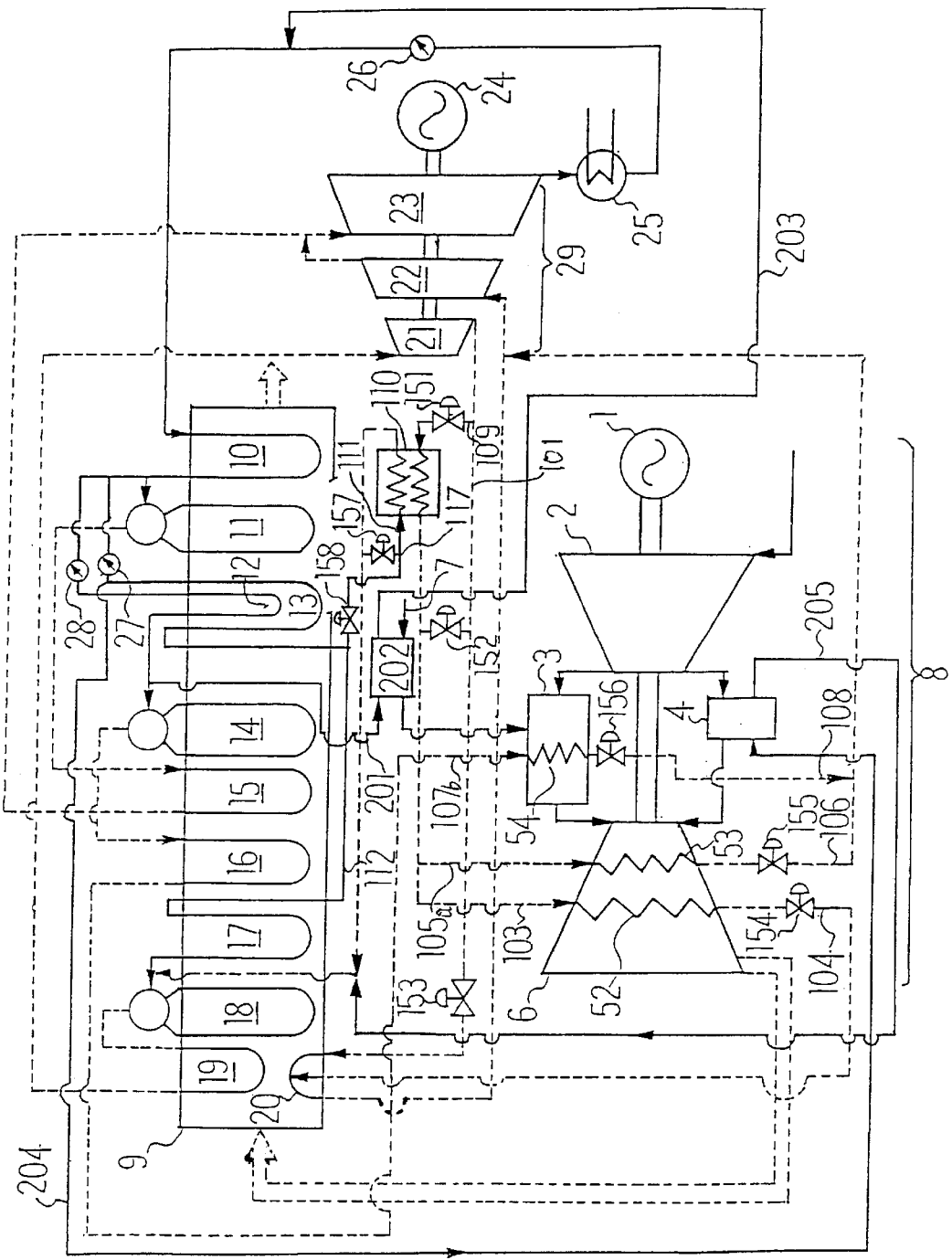
FIG. 15 is a diagram of a steam cooled gas turbine system of a fifteenth embodiment according to the present invention.

FIG. 15 is a diagram of a steam cooled gas turbine system of a fifteenth embodiment according to the present invention. In the present fifteenth embodiment, as compared with the tenth embodiment shown in FIG. 10, saturated steam partially extracted from the outlet of the intermediate pressure economizer 12 flows through the fuel heater 202 via the piping 201 for heating the fuel 7, and is then supplied to the inlet of the feed water heater 10 via the piping 203. By this arrangement, the fuel 7 is heated and the flow rate of the fuel is reduced. Thus, the gas turbine efficiency and the combined efficiency are enhanced.

Also, as compared with the tenth embodiment shown in FIG. 10, outlet water from the high pressure pump 27 is partially supplied via the piping 204 into the blade cooling air cooler 4. At the blade cooling air cooler 4, the water is heated by cooling air taken from the compressor 2 and the cooling air is cooled. The water is then recovered into the inlet of the high pressure evaporator 18. By this arrangement, the heat which has so far been discharged outside in vain by the cooling fan is recovered into the waste heat recovery boiler 9, and the combined efficiency is enhanced.

Figure 16:
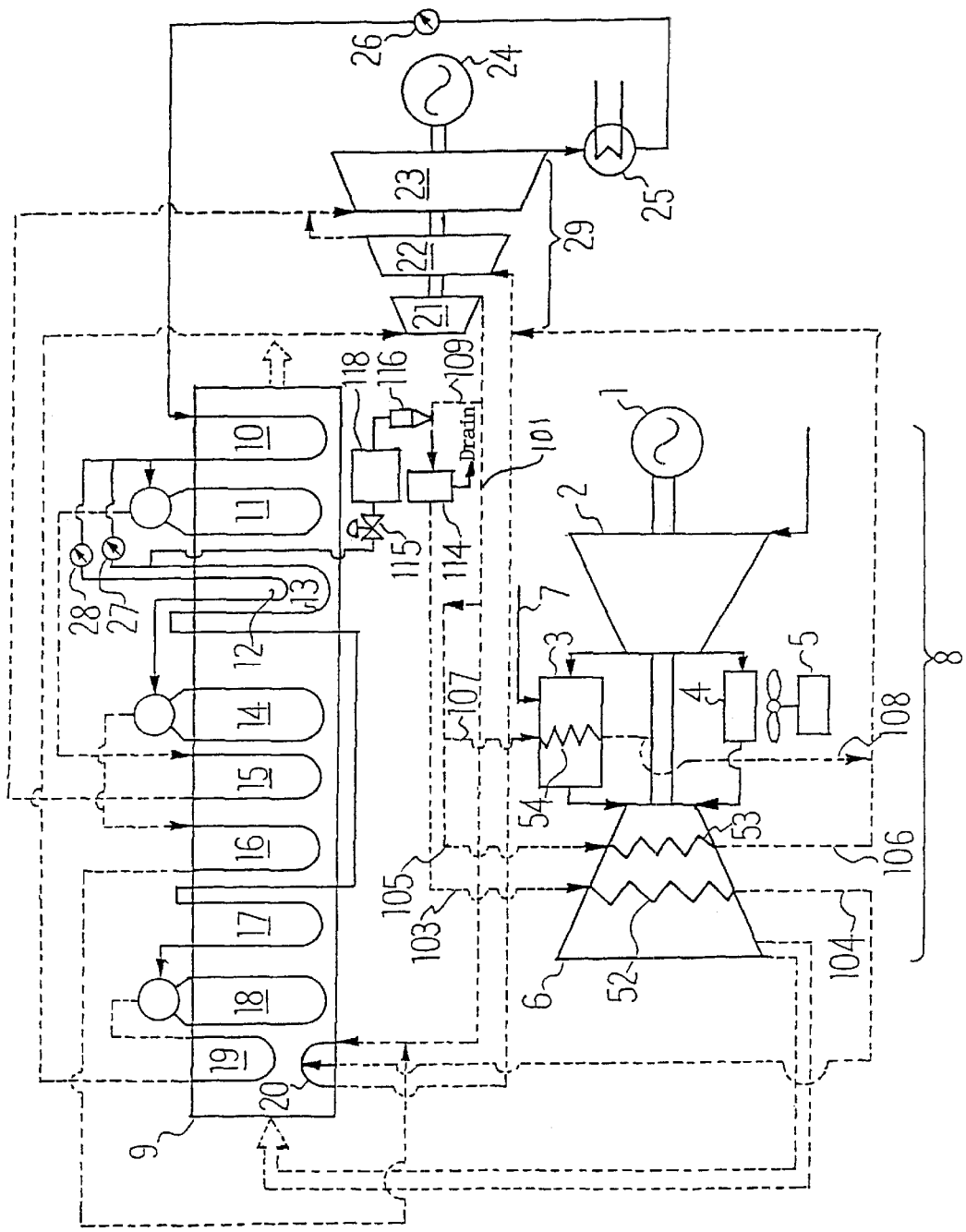
FIG. 16 is a diagram of a steam cooled gas turbine system of a sixteenth embodiment according to the present invention.

FIG. 16 is a diagram of a steam cooled gas turbine system of a sixteenth embodiment according to the present invention. In the present sixteenth embodiment, as compared with the first embodiment shown in FIG. 1, the heat exchanger 110, the piping 111, and the piping 112 which had been provided for cooling the moving blade cooling steam are eliminated. Instead, a water spray rate control valve 115, a demineralizer 118, a water sprayer 116, and a drain separator 114 are added for partially extracting outlet water from the high pressure pump 27 and controlling a spray of the water for cooling the blade cooling steam.

By this arrangement, the water spray rate is controlled by the water spray rate control valve 115, and the supply temperature of the moving blade cooling steam becomes adjustable more quickly than in the first embodiment. However, in order to remove impurities in the water, it is necessary to provide a demineralizer 118, as is usually used for removing dissolved minerals in the condenser of a supercritical pressure plant or a nuclear plant. Also, because a small quantity of drainage is generated after the water is sprayed by the water sprayer 116 into the blade cooling steam flowing through the piping 109, the drain separator 114 is provided for removing the drainage from the steam.

Thus, a quicker reduction in the supply temperature and supply quantity of the moving blade cooling steam becomes possible. Also, the temperature of the steam, after being used for the cooling, can be controlled with less variation in the quantity of the cooling steam. Hence, a spare quantity of the available steam is ensured and the reliability and life elongation of the cooled blade, rotor, and pipings can be ensured.

Figure 17:
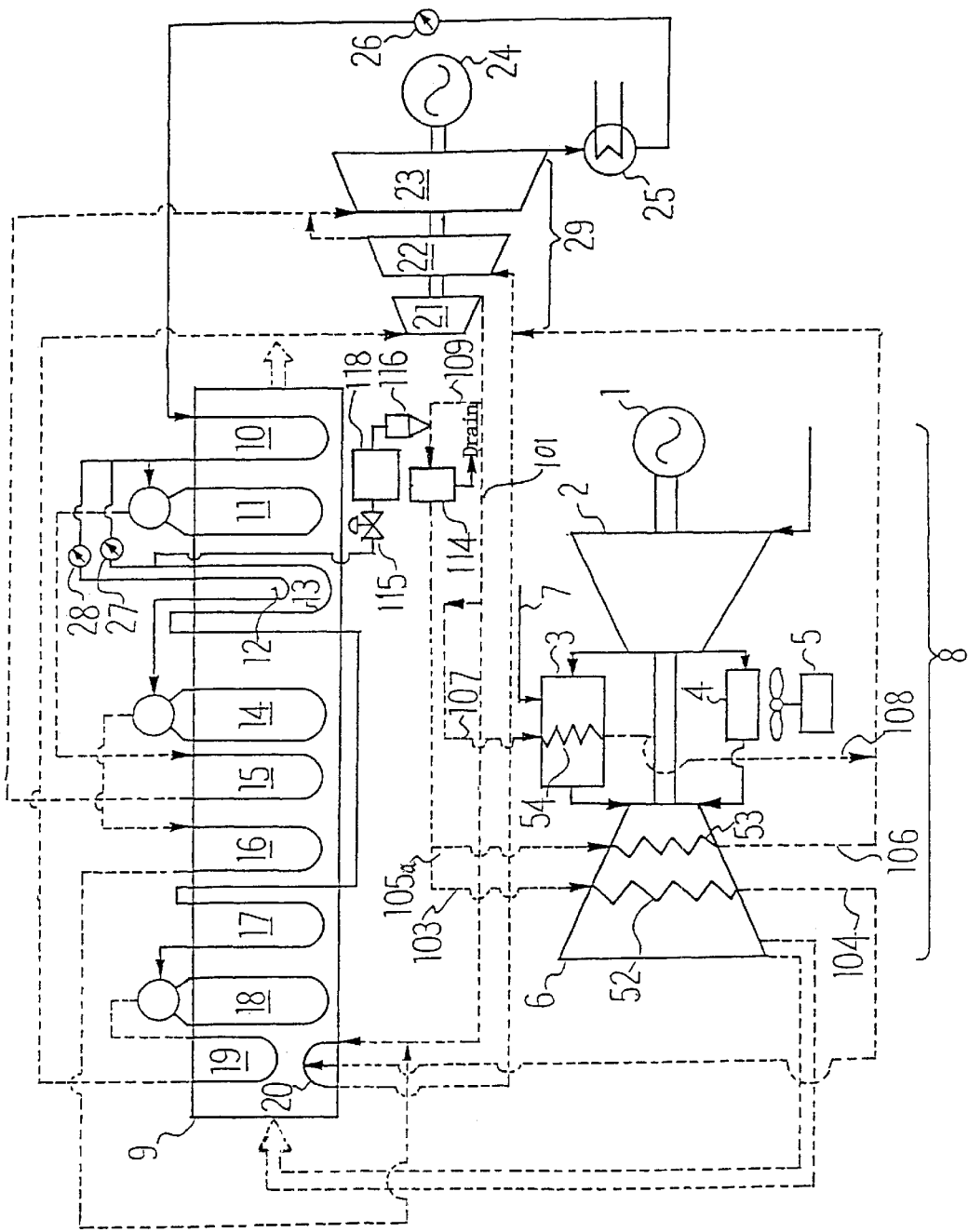
FIG. 17 is a diagram of a steam cooled gas turbine system of a seventeenth embodiment according to the present invention.

FIG. 17 is a diagram of a steam cooled gas turbine system of a seventeenth embodiment according to the present invention. In the present seventeenth embodiment, as compared with the second embodiment shown in FIG. 2, like in FIG. 16, the heat exchanger 110, the piping 111, and the piping 112 are eliminated. Instead, the water spray rate control valve 115, the demineralizer 118, the water sprayer 116 and the drain separator 114 are added for partially extracting outlet water from the high pressure pump 27 and controlling a spray of the water for cooling the blade cooling steam. The function of the components so added is the same as that described with respect to FIG. 16, and a description thereof is omitted.

By this arrangement, a reduction in the supply temperature and supply quantity of the moving blade and stationary blade cooling steam, which is quicker than in the second embodiment, becomes possible. Also, the temperature of the steam, after being used for the cooling, can be controlled with less variation in the quantity of the cooling steam. Hence, a spare quantity of the available steam is ensured, and the reliability and life elongation of the cooled blade, rotor, and pipings can be ensured.

Figure 18:
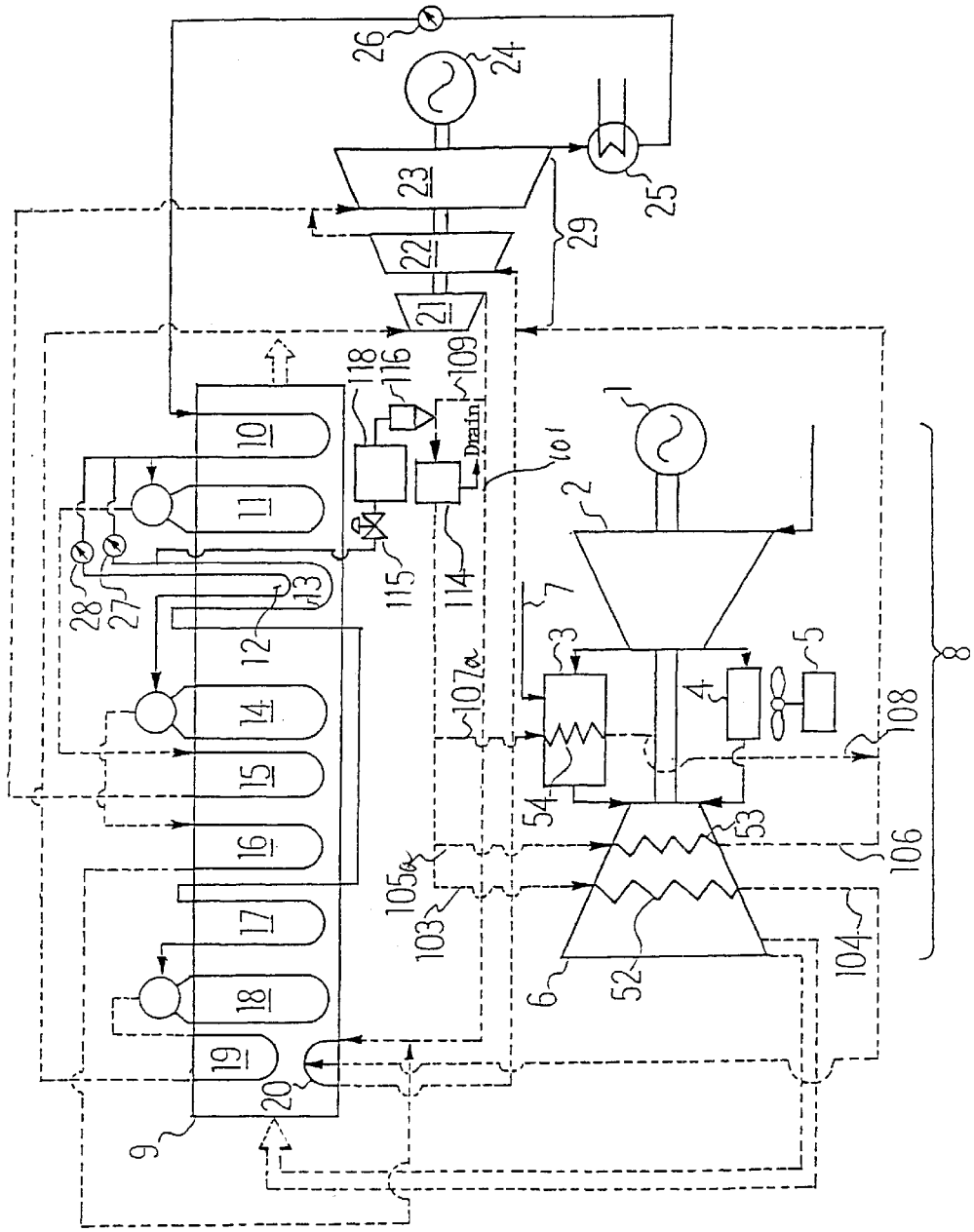
FIG. 18 is a diagram of a steam cooled gas turbine system of an eighteenth embodiment according to the present invention.

FIG. 18 is a diagram of a steam cooled gas turbine system of an eighteenth embodiment according to the present invention. In the present eighteenth embodiment, as compared with the third embodiment shown in FIG. 3, like in FIG. 16, instead of the heat exchanger 110, the piping 111 and the piping 112, the water spray rate control valve 115, the demineralizer 118, the water sprayer 116, and the drain separator 114 are employed for partially extracting outlet water from the high pressure pump 27 and controlling a spray of the water for cooling the blade cooling steam. The construction of other portions of the present embodiment is the same as that shown in FIG. 3. Also, the function of the components 114, 115, 116 and 118 so employed is the same as that described with respect to FIG. 16, and a description thereof is omitted.

In the present eighteenth embodiment, a reduction in the supply temperature and supply quantity of the moving blade and stationary blade cooling steam, as well as of the combustor transition piece cooling steam, becomes possible. Also, the temperature of the steam, after being used for the cooling, can be controlled with less variation in the quantity of the cooling steam. Hence, a spare quantity of the available steam is ensured, and the reliability and life elongation of the cooled blade, combustor transition piece, rotor, and pipings can be ensured.

Figure 19:
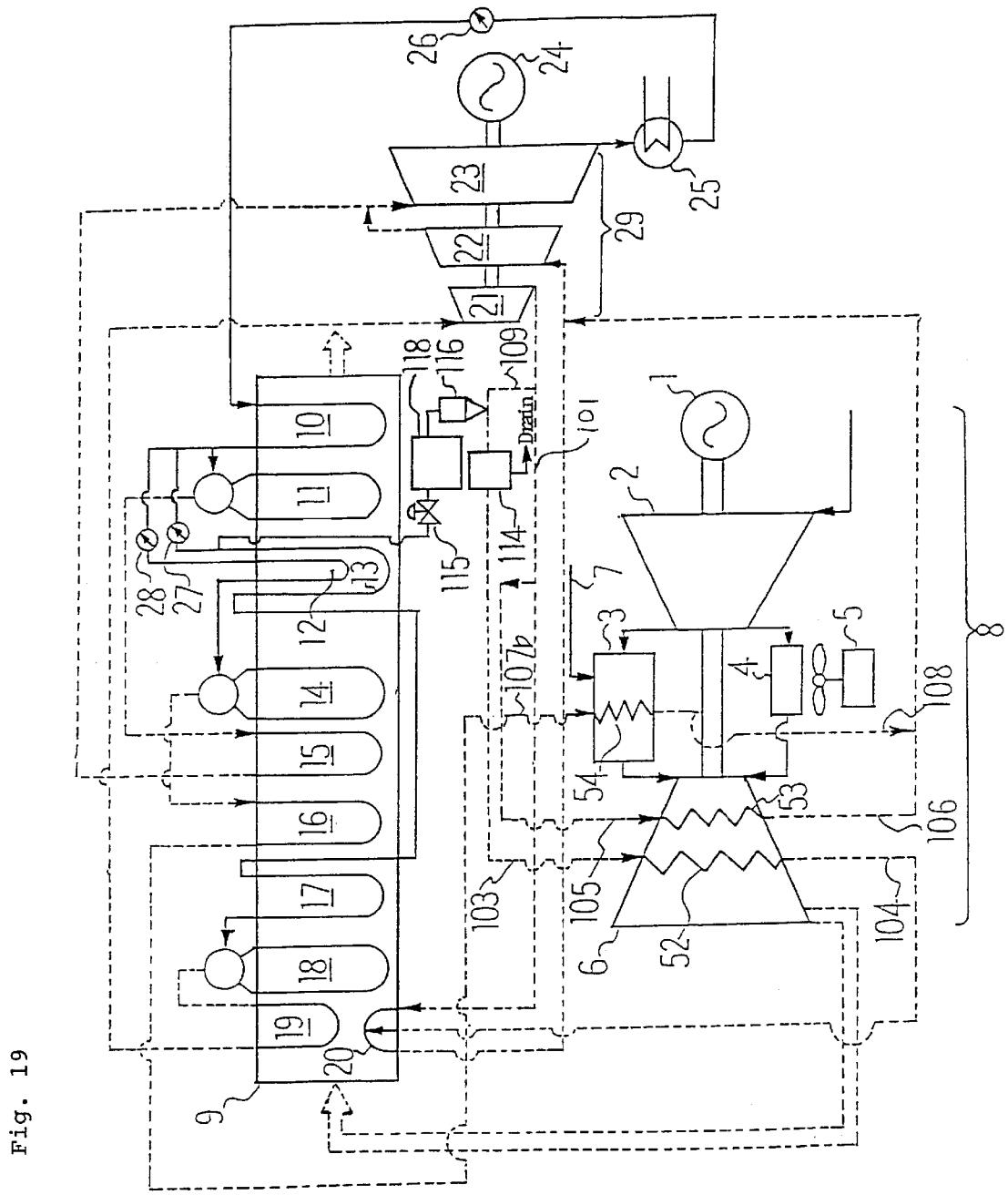
FIG. 19 is a diagram of a steam cooled gas turbine system of a nineteenth embodiment according to the present invention.

FIG. 19 is a diagram of a steam cooled gas turbine system of a nineteenth embodiment according to the present invention. In the present nineteenth embodiment, as compared with the fourth embodiment shown in FIG. 4, like in FIG. 16, instead of the heat exchanger 110, the piping 111, and the piping 112, the water spray rate control valve 115, the demineralizer 118, the water sprayer 116, and the drain separator 114 are employed for partially extracting outlet water from the high pressure pump 27 and controlling a spray of the water for cooling the blade cooling steam. The construction of other portions of the present embodiment is the same as that shown in FIG. 4. Also, the function of the components 114, 115, 116 and 118 so employed is the same as that described with respect to FIG. 16, and a description thereof is omitted.

In the present nineteenth embodiment, a quicker reduction in the supply temperature and supply quantity of the moving blade cooling steam becomes possible. Also, the temperature of the steam, after being used for the cooling, can be controlled with less variation in the quantity of the cooling steam. Hence, a spare quantity of the available steam is ensured, and the reliability and life elongation of the cooled blade, rotor, and pipings can be ensured.

Figure 20:
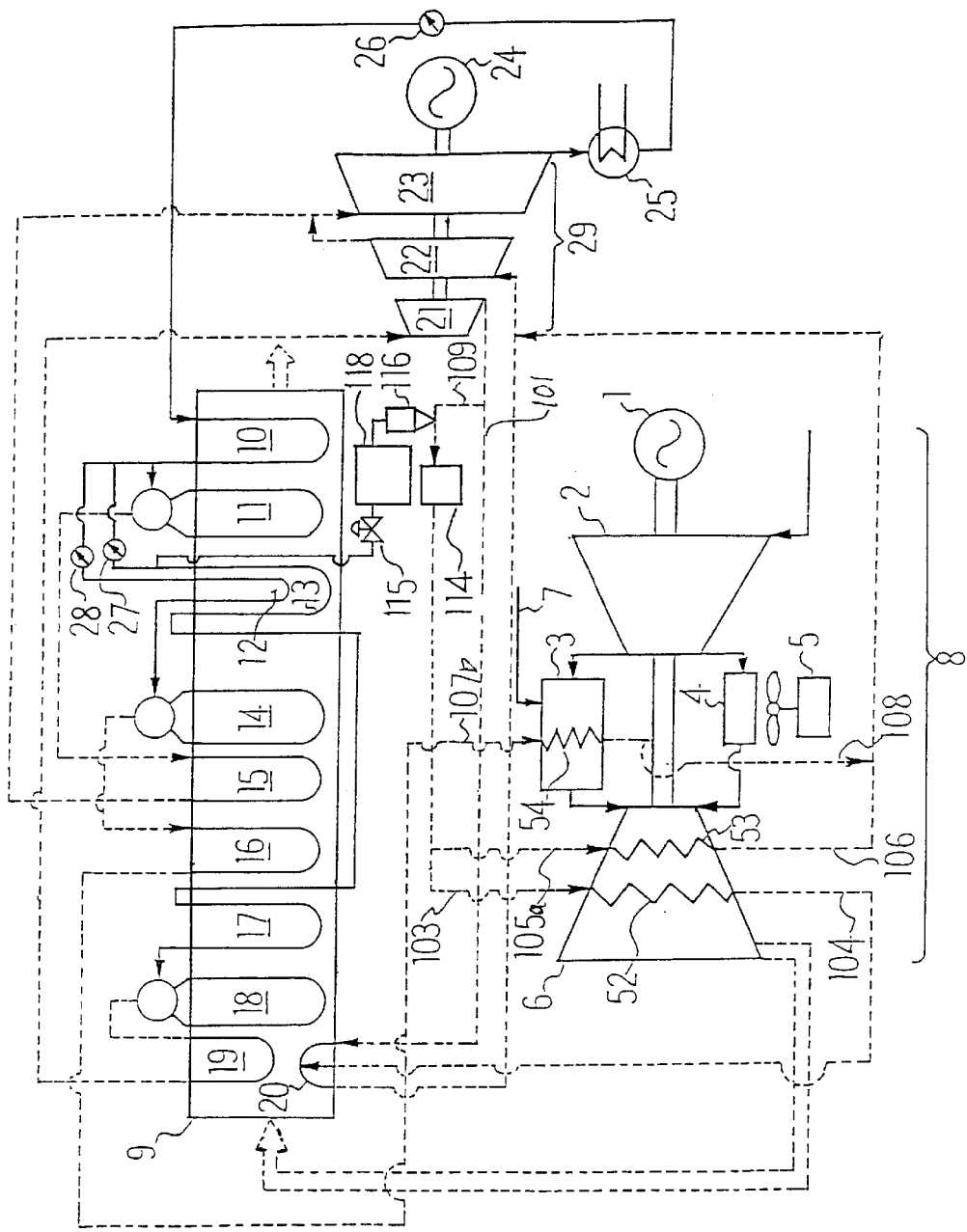
FIG. 20 is a diagram of a steam cooled gas turbine system of a twentieth embodiment according to the present invention.

FIG. 20 is a diagram of a steam cooled gas turbine system of a twentieth embodiment according to the present invention. In the present twentieth embodiment, as compared with the fifth embodiment shown in FIG. 5, like in FIG. 16, instead of the heat exchanger 110, the piping 111, and the piping 112, the water spray rate control valve 115, the demineralizer 118, the water sprayer 116, and the drain separator 114 are employed for partially extracting outlet water from the high pressure pump 27 and controlling a spray of the water for cooling the blade cooling steam. The construction of other portions of the present embodiment is the same as that shown in Fig. 5. Also, the function of the components 114, 115, 116 and 118 so employed is the same as that described with respect to FIG. 16, and a description thereof is omitted.

In the present twentieth embodiment, a quicker reduction in the supply temperature and supply quantity of the moving blade and stationary blade cooling steam becomes possible. Also, the temperature of the steam, after being used for the cooling, can be controlled with less variation in the quantity of the cooling steam. Hence, a spare quantity of the available steam is ensured and the reliability and life elongation of the cooled blade, rotor, and pipings can be ensured.

Figure 21:
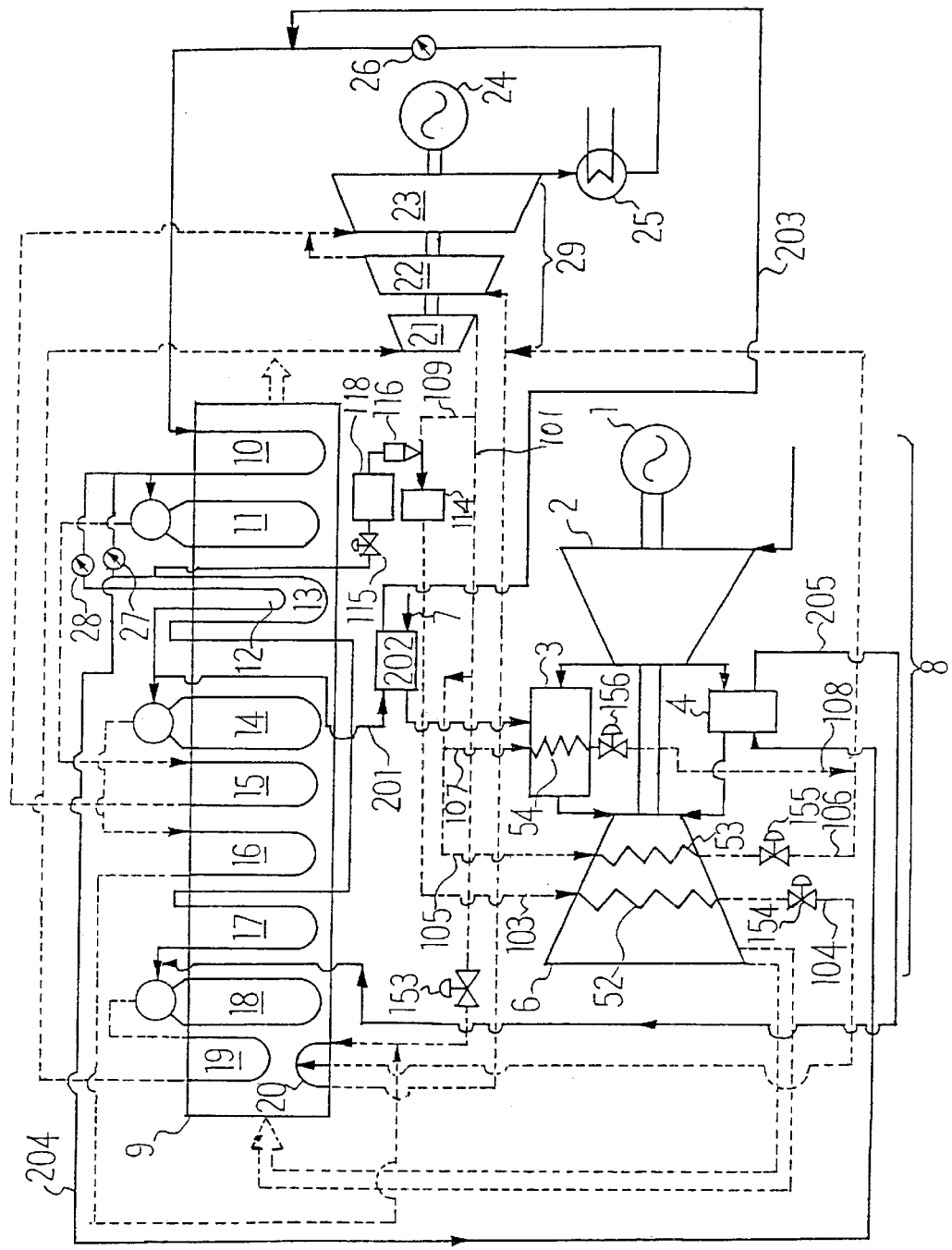
FIG. 21 is a diagram of a steam cooled gas turbine system of a twenty-first embodiment according to the present invention.

FIG. 21 is a diagram of a steam cooled gas turbine system of a twenty-first embodiment according to the present invention. In the present twenty-first embodiment, as compared with the eleventh embodiment shown in FIG. 11, the heat exchanger 110, the piping 111, and the piping 112 which had been provided for cooling the moving blade cooling steam are eliminated. Instead, the water spray rate control valve 115, the demineralizer 118, the water sprayer 116, and the drain separator 114 are added for partially extracting outlet water from the high pressure pump 27 and controlling a spray of the water for cooling the blade cooling steam.

By this arrangement, the water spray rate is controlled by the water spray rate control valve 115, and the supply temperature of the moving blade cooling steam becomes adjustable more quickly than in the eleventh embodiment. However, in order to remove impurities in water, it is necessary to provide a demineralizer 118 as is usually used for removing dissolved minerals in the condenser of a supercritical pressure plant or a nuclear plant. Also, as a small quantity of drainage is generated after the water is sprayed by the water sprayer 116 into the blade cooling steam flowing through the piping 109, the drain separator 114 is provided for removing the drainage from the steam.

Thus, a quicker reduction in the supply temperature and supply quantity of the moving blade cooling steam becomes possible. Also, the temperature of the steam, after being used for the cooling, can be controlled with less variation in the quantity of the cooling steam. Hence, a spare quantity of the available steam is ensured, and the reliability and life elongation of the cooled blade, rotor, and piping can be ensured.

Figure 22:
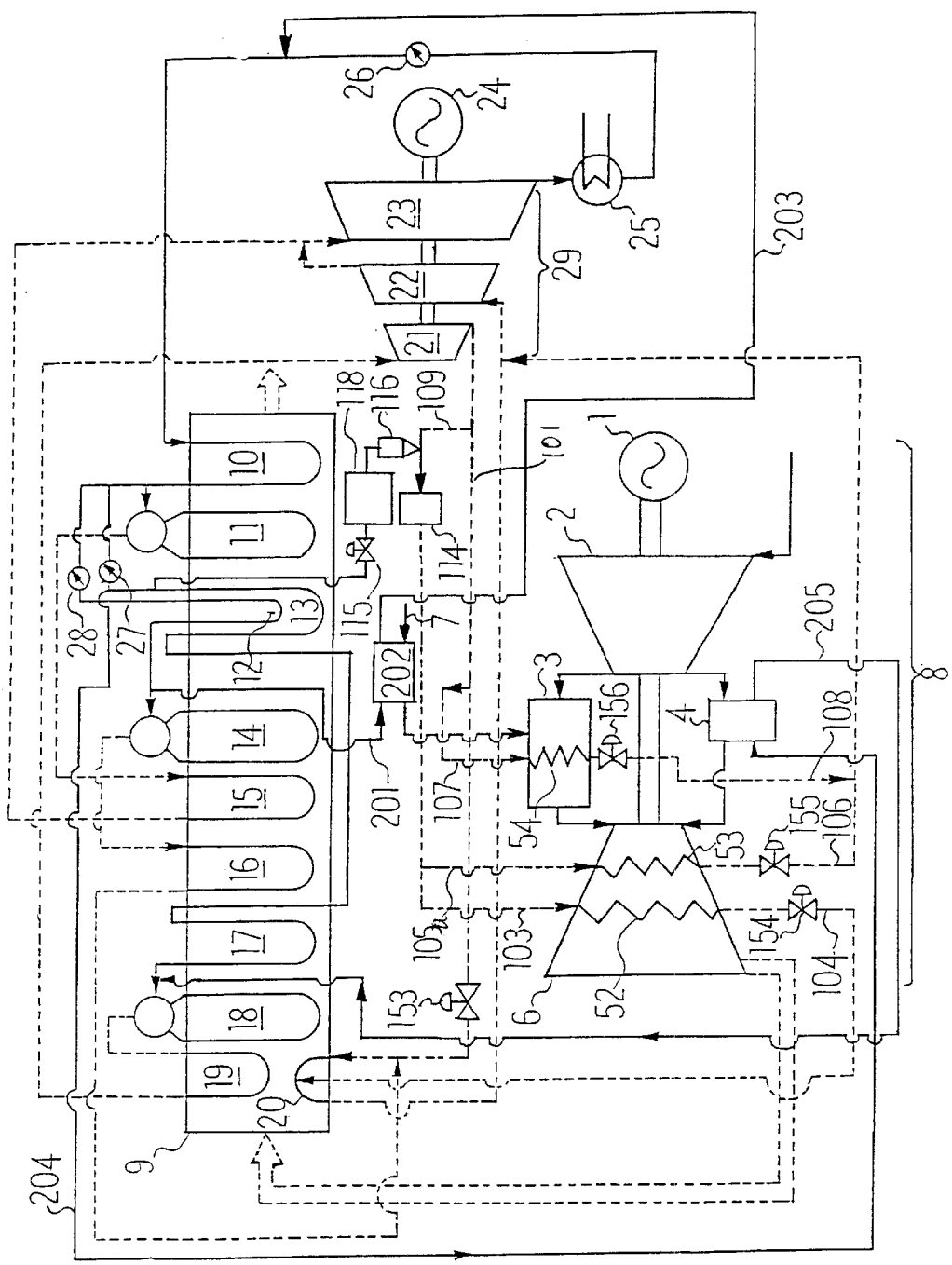
FIG. 22 is a diagram of a steam cooled gas turbine system of a twenty-second embodiment according to the present invention.

FIG. 22 is a diagram of a steam cooled gas turbine system of a twenty-second embodiment according to the present invention. In the present twenty-second embodiment, as compared with the twelfth embodiment shown in FIG. 12, like in FIG. 21, instead of the heat exchanger 110, the piping 111, and the piping 112, the water spray rate control valve 115, the demineralizer 118, the water sprayer 116, and the drain separator 114 are employed for cooling the moving blade and stationary blade cooling steam. The function of the components so employed is the same as that described with respect to FIG. 21, and a description thereof is omitted.

By this arrangement, a reduction in the supply temperature and supply quantity of the moving blade and stationary blade cooling steam becomes possible. Also, the temperature of the steam, after being used for the cooling, can be controlled with less variation in the quantity of the cooling steam. Hence, a spare quantity of the available steam is ensured, and the reliability and life elongation of the cooled blade, rotor, and pipings can be ensured.

Figure 23:
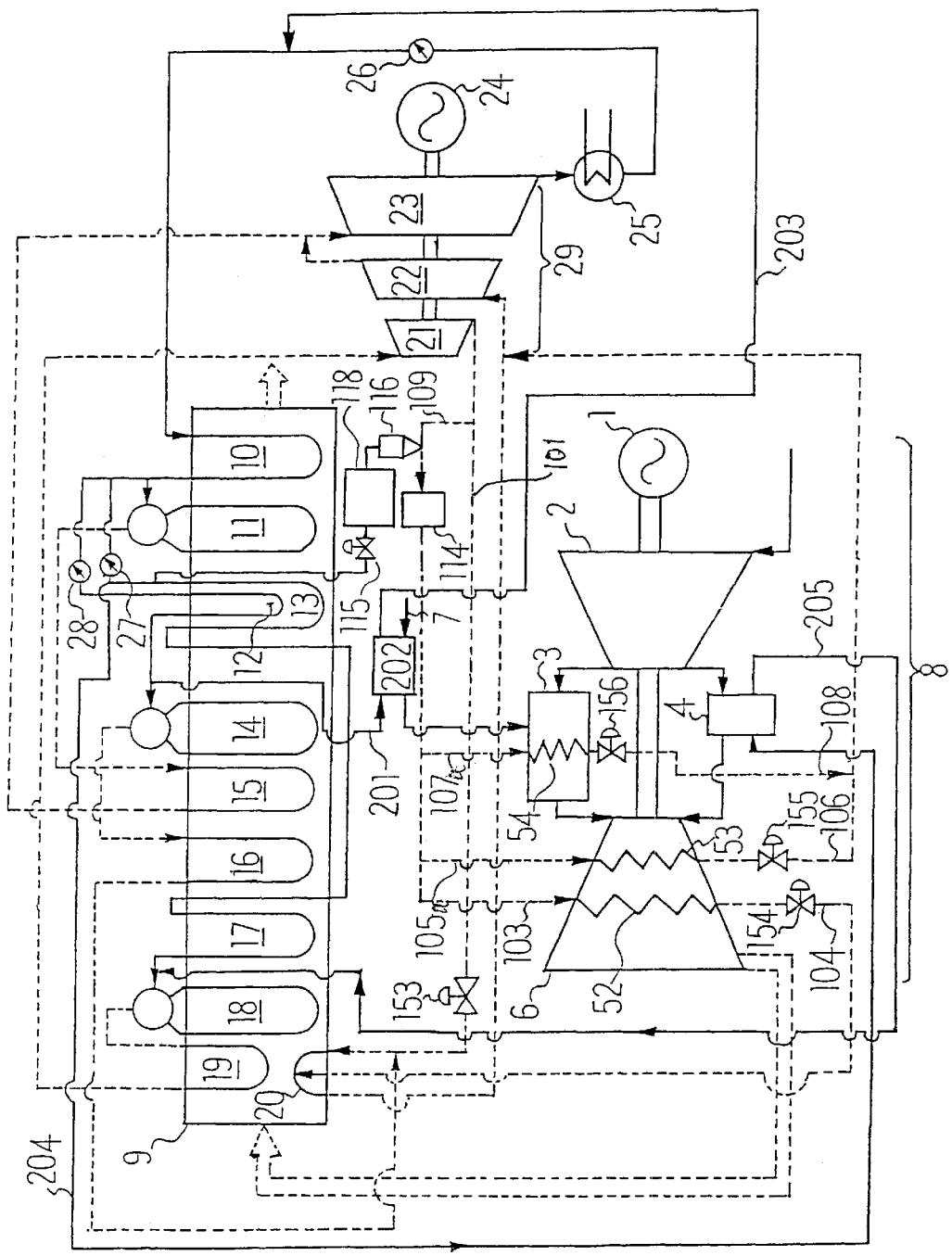
FIG. 23 is a diagram of a steam cooled gas turbine system of a twenty-third embodiment according to the present invention.

FIG. 23 is a diagram of a steam cooled gas turbine system of a twenty-third embodiment according to the present invention. In the present twenty-third embodiment, as compared with the thirteenth embodiment shown in FIG. 13, like in FIG. 21, instead of the heat exchanger 110, the piping 111, and the piping 112, the water spray rate control valve 115, the demineralizer 118, the water sprayer 116, and the drain separator 114 are employed. The construction of other portions of the present embodiment is the same as that shown in FIG. 13. Also, the function of the components 114, 115, 116, and 118 so employed is the same as that described with respect to FIG. 21, and a description thereof is omitted.

In the present twenty-third embodiment, a reduction in the supply temperature and supply quantity of the moving blade and stationary blade cooling steam, as well as of the combustor transition piece cooling steam, becomes possible. Also, the temperature of the steam, after being used for the cooling, can be controlled with less variation in the quantity of the cooling steam. Hence, a spare quantity of the available steam is ensured, and the reliability and life elongation of the cooled blade, combustor transition piece, rotor, and pipings can be ensured.

Figure 24:
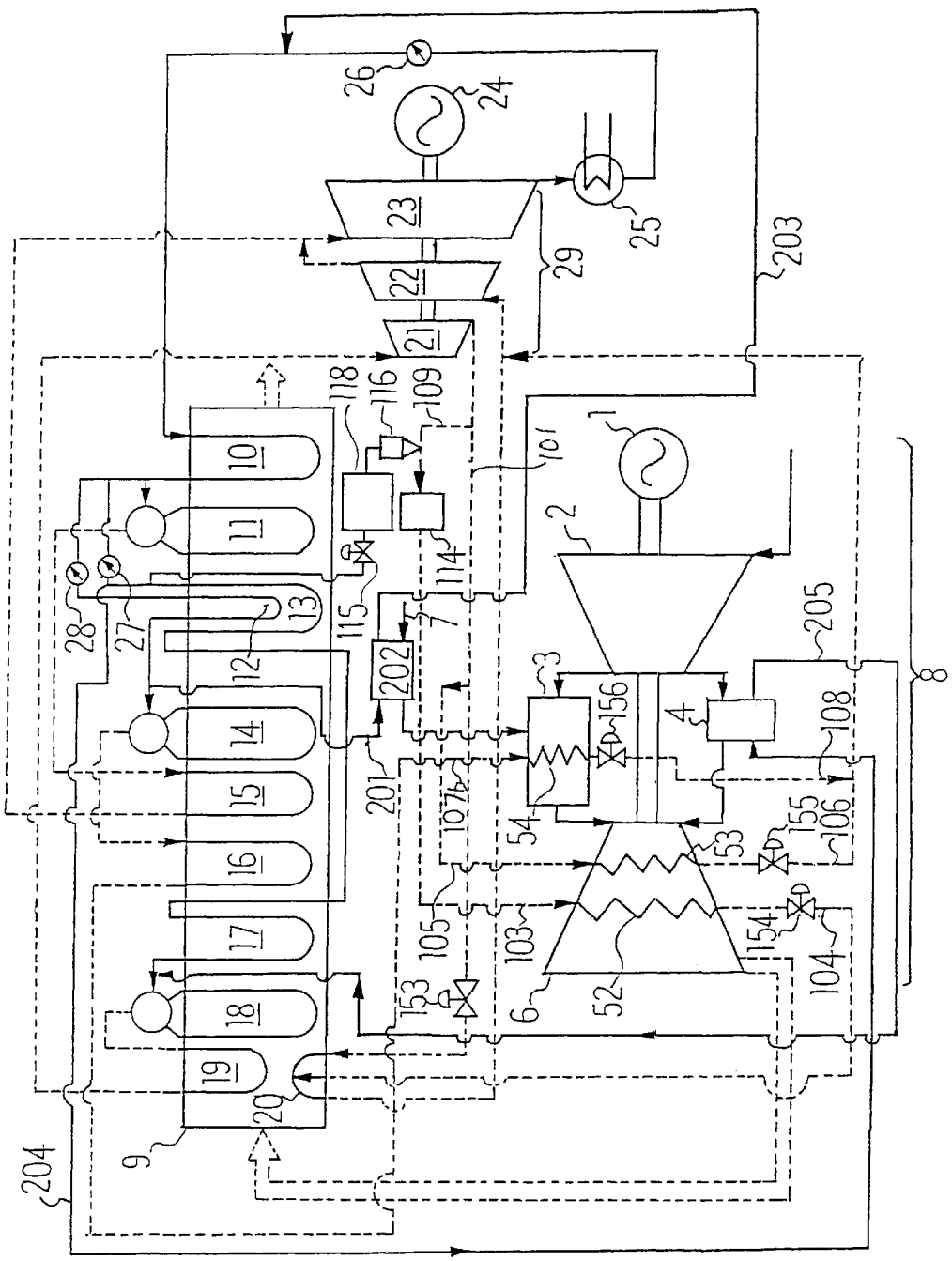
FIG. 24 is a diagram of a steam cooled gas turbine system of a twenty-fourth embodiment according to the present invention.

FIG. 24 is a diagram of a steam cooled gas turbine system of a twenty-fourth embodiment according to the present invention. In the present twenty-fourth embodiment, as compared with the fourteenth embodiment shown in FIG. 14, like in FIG. 21, instead of the heat exchanger 110, the piping 111, and the piping 112, the water spray rate control valve 115, the demineralizer 118, the water sprayer 116, and the drain separator 114 are employed. The construction of other portions of the present embodiment is the same as that shown in FIG. 14. Also, the function of the components 114, 115, 116, and 118 so employed is the same as that described with respect to FIG. 21, and a description thereof is omitted.

In the present twenty-fourth embodiment, a quicker reduction in the supply temperature and supply quantity of the moving blade cooling steam becomes possible. Also, the temperature of the steam, after being used for the cooling can be controlled with less variation in the quantity of the cooling steam. Hence, a spare quantity of the available steam is ensured, and the reliability and life elongation of the cooled blade, rotor, and pipings can be ensured.

Figure 25:
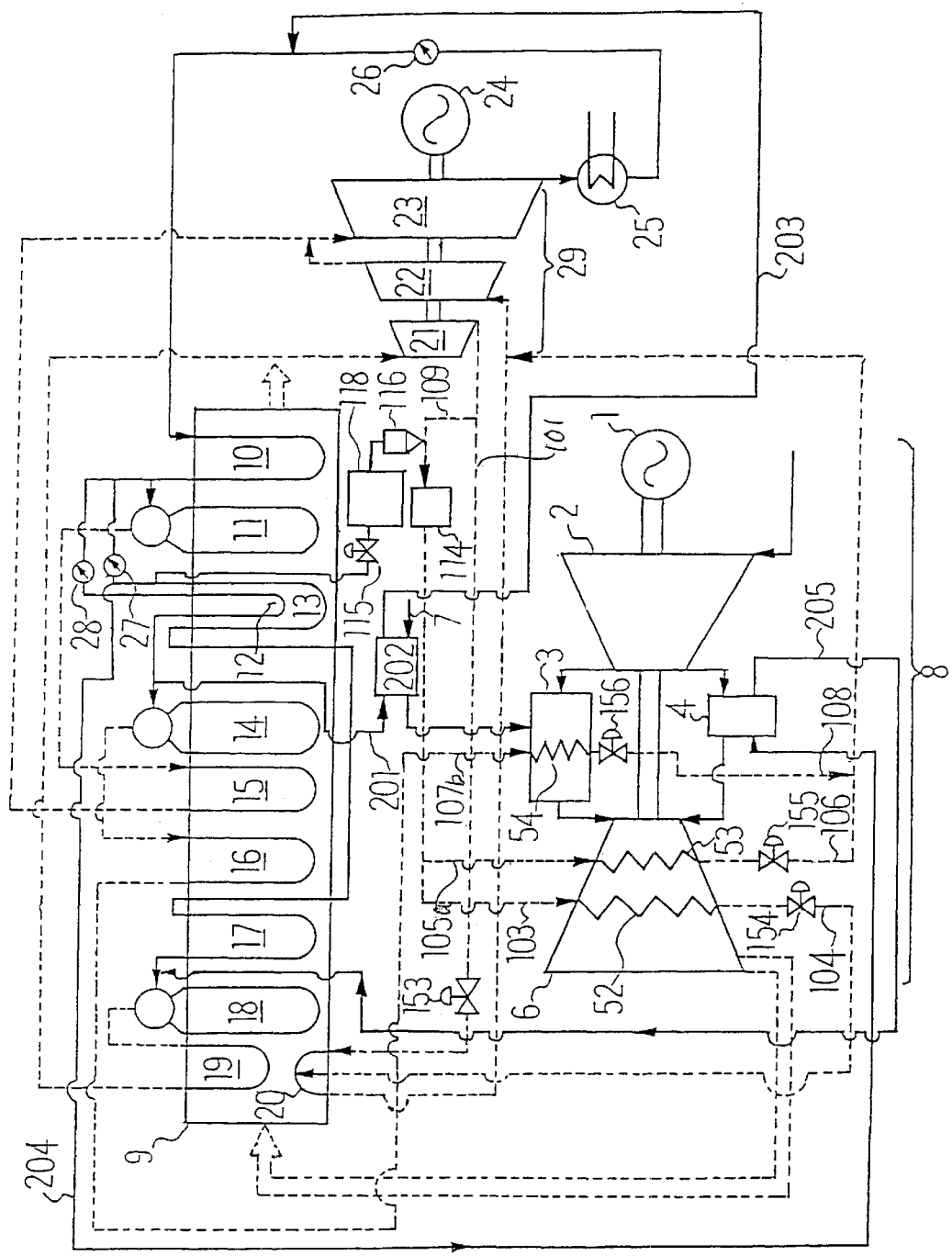
FIG. 25 is a diagram of a steam cooled gas turbine system of a twenty-fifth embodiment according to the present invention.

FIG. 25 is a diagram of a steam cooled gas turbine system of a twenty-fifth embodiment according to the present invention. In the present twenty-fifth embodiment, as compared with the fifteenth embodiment shown in FIG. 15, like in FIG. 21, instead of the heat exchanger 110, the piping 111, and the piping 112, the water spray rate control valve 115, the demineralizer 118, the water sprayer 116, and the drain separator 114 are employed. The construction of other portions of the present embodiment is the same as that shown in FIG. 15. Also, the function of the components 114, 115, 116, and 118 so employed is the same as that described with respect to FIG. 21, and a description thereof is omitted.

In the present twenty-fifth embodiment, a quicker reduction in the supply temperature and supply quantity of the moving blade and stationary blade cooling steam becomes possible. Also, the temperature of the steam, after being used for the cooling, can be controlled with less variation in the quantity of the cooling steam. Hence, a spare quantity of the available steam is ensured, and the reliability and life elongation of the cooled blade, rotor, and pipings can be ensured.

It is to noted that, in the mentioned embodiments, while a case in which the cooling of the stationary blade only or the combustor transition piece only is performed via the heat exchanger 110 or the water sprayer 116 has not been illustrated, such a case is, needless to mention, possible. Heated steam after being used for the cooling in such case may be recovered into the waste heat recovery boiler 9.

Also, in the mentioned embodiments, while a case where the steam used for the cooling of the moving blade and stationary blade via the heat exchanger 110 or the water sprayer 116 is recovered into the waste heat recovery boiler 9, or a case in which the steam used for the cooling of the moving blade, stationary blade, and combustor transition piece via the heat exchanger 110 or the water sprayer 116 is recovered into the waste heat recovery boiler 9 has not been illustrated, both of such cases are, needless to mention, possible. Heated steam after being used for the cooling in such cases may be recovered into the waste heat recovery boiler 9.

While preferred embodiments have been illustrated and described, it is to be understood that modifications thereof will be apparent to those skilled in the art without departing from the spirit of the invention. The scope of the invention, therefore, is to be determined solely by the appended claims.

What is claimed is:
1. A steam cooled gas turbine system comprising:
  a steam turbine including:
    a high pressure turbine;
    an intermediate pressure turbine; and
    a low pressure turbine;
  a condenser for condensing exhaust steam from said low pressure turbine of said steam turbine to produce water;
  a gas turbine including:
    a compressor for compressing air;
    a combustor for combusting fuel with the compressed air from said compressor to produce a high temperature combustion gas; and
    a turbine for expanding the high temperature combustion gas from said combustor so as to drive a generator, said turbine including a moving blade;
  a cooling steam system for cooling said combustor and said moving blade of said turbine, said cooling steam system including a heat exchanger; and
  a waste heat recovery boiler for receiving exhaust gas from said gas turbine to heat and vaporize the water from said condenser so as to generate steam to be supplied to said high pressure turbine, said intermediate pressure turbine, and said low pressure turbine, said waste heat recovery boiler including:
    a feed water heater;
    an intermediate pressure economizer;
    a first high pressure economizer;
    a second high pressure economizer;
    a low pressure superheater;
    an intermediate pressure superheater;
    a high pressure superheater;
    a high pressure evaporator; and
    a reheater;
  wherein said cooling steam system, said steam turbine, said gas turbine, and said waste heat recovery boiler are arranged such that outlet steam from said high pressure turbine flows through and is cooled by said heat exchanger of said cooling steam system, the cooled outlet steam from said heat exchanger then flows into said moving blade of said turbine to cool said moving blade, and the cooled outlet steam from said moving blade then flows into said reheater, and said cooling steam system and said waste heat recovery boiler are arranged such that a cooling water from said first high pressure economizer flows through said heat exchanger so as to be heated, and the heated water from said heat exchanger then flows into said high pressure evaporator.

2. The steam cooled gas turbine system of claim 1, wherein said turbine further comprises a stationary blade cooled by the cooled outlet steam from said heat exchanger.

3. The steam cooled gas turbine system of claim 2, wherein said combustor includes a combustor transition piece cooled by the cooled outlet steam from said heat exchanger.

4. The steam cooled gas turbine system of claim 1, wherein said cooling steam system further includes an outlet steam regulating valve for regulating an amount of the outlet steam from said high pressure turbine flowing through and cooled by said heat exchanger.

5. The steam cooled gas turbine system of claim 4, wherein said cooling steam system further includes a cooling water flow regulating valve for regulating an amount of the cooling water from said first high pressure economizer flowing through and heated by said heat exchanger.

6. The steam cooled gas turbine system of claim 1, wherein said cooling steam system further includes a cooling water flow regulating valve for regulating an amount of the cooling water from said first high pressure economizer flowing through and heated by said heat exchanger.

7. A steam cooled gas turbine system comprising:
  a steam turbine including:
    a high pressure turbine;

an intermediate pressure turbine; and
a low pressure turbine;
a condenser for condensing exhaust steam from said low pressure turbine of said steam turbine to produce water;
a gas turbine including:
   a compressor for compressing air;
   a combustor for combusting fuel with the compressed air from said compressor to produce a high temperature combustion gas, said combustor including a combustor transition piece and a combustor transition piece cooling steam outlet flow regulating valve;
   a fuel heater for heating fuel flowing to said combustor;
   a turbine for expanding the high temperature combustion gas from said combustor so as to drive a generator, said turbine including a moving blade having a moving blade cooling steam outlet flow regulating valve, and including a stationary blade having a stationary blade cooling steam outlet flow regulating valve; and
   a blade cooling air cooler for cooling blade cooling air from said turbine;
a cooling steam system for cooling said combustor and said moving blade of said turbine, said cooling steam system including:
   a water spray rate control valve;
   a demineralizer;
   a cooling steam passage extending from an outlet of said high pressure turbine to said gas turbine such that cooling steam flows through said cooling steam passage from said high pressure turbine to said gas turbine for cooling said moving blade;
   a water sprayer connected to said cooling steam passage; and
   a drain separator in said cooling steam passage and located between said water sprayer and said gas turbine, for removing drainage from cooling steam in said cooling steam passage; and
a waste heat recovery boiler for receiving exhaust gas from said gas turbine to heat and vaporize the water from said condenser so as to generate steam to be supplied to said high pressure turbine, said intermediate pressure turbine, and said low pressure turbine, said waste heat recovery boiler including:
   a feed water heater;
   an intermediate pressure economizer;
   a first high pressure economizer;
   a second high pressure economizer;
   a low pressure superheater;
   an intermediate pressure superheater;
   a high pressure superheater;
   a high pressure evaporator; and
   a reheater including a reheater inlet flow regulating valve for regulating a flow of steam into said reheater from said high pressure turbine;
wherein said cooling steam system, said gas turbine, and said waste heat recovery boiler are arranged such that said water spray rate control valve receives high pressure water from said feed water heater, said demineralizer receives the high pressure water from said water spray rate control valve and produces demineralized high pressure water, said water sprayer receives the demineralized high pressure water from said demineralizer and sprays the demineralized high pressure water into the cooling steam flowing through said cooling steam passage, and the cooling steam flows through said moving blade of said turbine and then flows into said reheater;
wherein said gas turbine and said waste heat recovery boiler are arranged such that said fuel heater receives outlet steam from said intermediate pressure economizer to heat the fuel flowing to said combustor, and the steam cooled in said fuel heater by heating the fuel flows into said feed water heater; and
wherein said gas turbine and said waste heat recovery boiler are arranged such that said blade cooling air cooler receives a portion of the high pressure water from said feed water heater for cooling the blade cooling air into said turbine, and the high pressure water heated in said blade cooling air cooler by cooling the blade cooling air flows into said high pressure evaporator.

* * * * *